United States Patent
Bold et al.

(10) Patent No.: US 12,552,515 B2
(45) Date of Patent: Feb. 17, 2026

(54) AEROSPACE COMPONENT JOINTS FOR AIRCRAFT AND RELATED METHODS

(71) Applicant: Aurora Flight Sciences Corporation, a subsidiary of The Boeing Company, Manassas, VA (US)

(72) Inventors: Jens Bold, Munich (DE); Bruno Miguel Costa Moniz, Lucerne (CH); Angelo Esposito, Adligenswil (CH); Fernando Ricardo C. Leite, Lucerne (CH)

(73) Assignee: Aurora Flight Sciences Corporation, a subsidiary of The Boeing Company, Mannassas, VA (US)

( * ) Notice: Subject to any disclaimer, the term of this patent is extended or adjusted under 35 U.S.C. 154(b) by 1126 days.

(21) Appl. No.: 17/531,586

(22) Filed: Nov. 19, 2021

(65) Prior Publication Data
US 2023/0159151 A1    May 25, 2023

(51) Int. Cl.
*B64C 1/12* (2006.01)
*B29C 65/54* (2006.01)
*B64C 1/26* (2006.01)
*B29L 31/30* (2006.01)

(52) U.S. Cl.
CPC ............... *B64C 1/12* (2013.01); *B29C 65/54* (2013.01); *B64C 1/26* (2013.01); *B29L 2031/3076* (2013.01)

(58) Field of Classification Search
CPC .... B64C 1/12; B64C 1/22; B64C 1/24; B64C 1/26; B64C 1/32; B29C 65/54; B29C 65/56; B29C 65/60; B29L 2031/3076
See application file for complete search history.

(56) References Cited

U.S. PATENT DOCUMENTS

2020/0156757 A1*   5/2020   Coluni .................. B64C 1/18

* cited by examiner

*Primary Examiner* — Daniel J Wiley
(74) *Attorney, Agent, or Firm* — Kolitch Romano Dascenzo Gates LLP

(57) ABSTRACT

The aerospace component joints comprise a first component member comprising a first bonding face, a second component member comprising a second bonding face, one or more bond-enhancing features, and an adhesive layer forming a bond between the first and second bonding faces. The one or more bond-enhancing features comprises a plurality of reinforcing protrusions integral with the first component member, projecting from the first bonding face through the adhesive layer, and into the component member and/or one or more adhesive-receiving recesses defined in the first or second bonding faces and filled by the adhesive layer. The methods of preparing a component member for an aerospace component joint comprise integrating one or more bond-enhancing features into the component member. The methods of forming the aerospace component joint comprise positioning and adhesive-bonding the first bonding face to the second bonding face, and integrating the bond-enhancing feature(s) into the aerospace component joint.

23 Claims, 8 Drawing Sheets

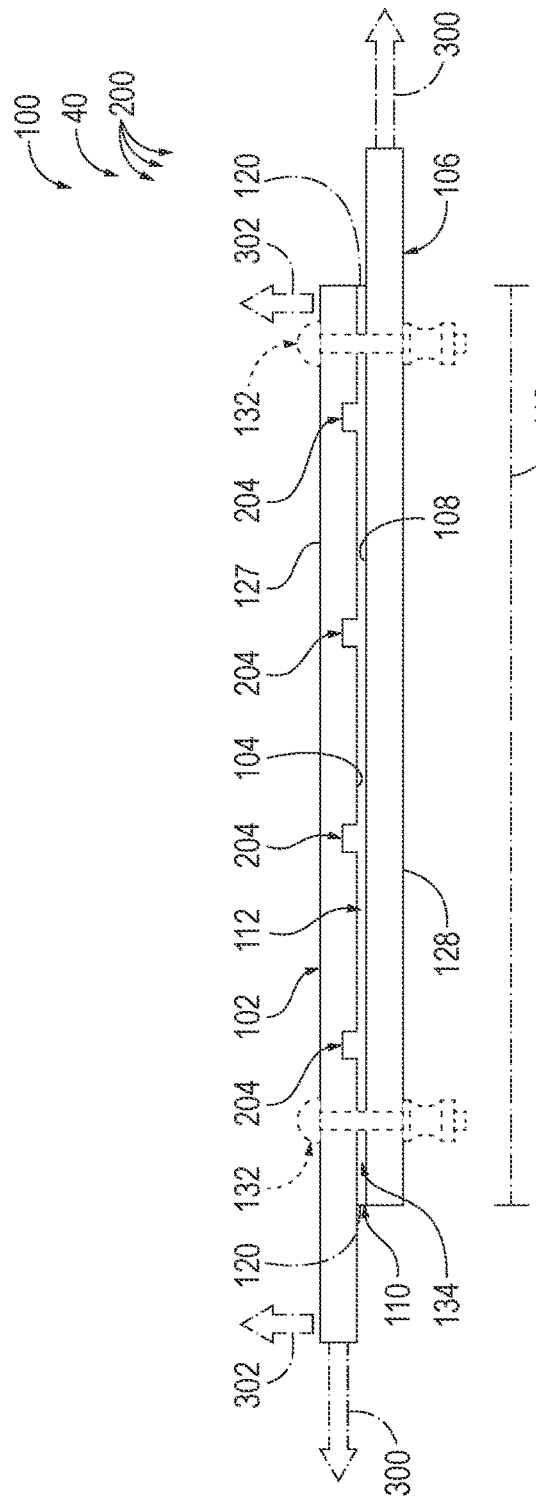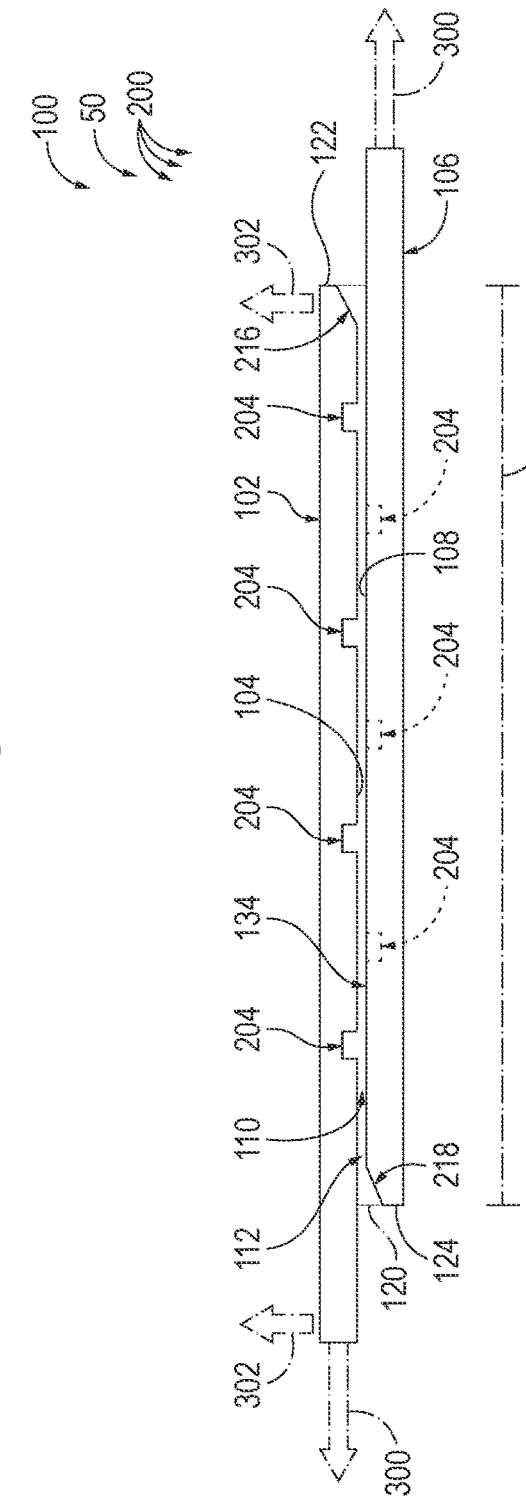

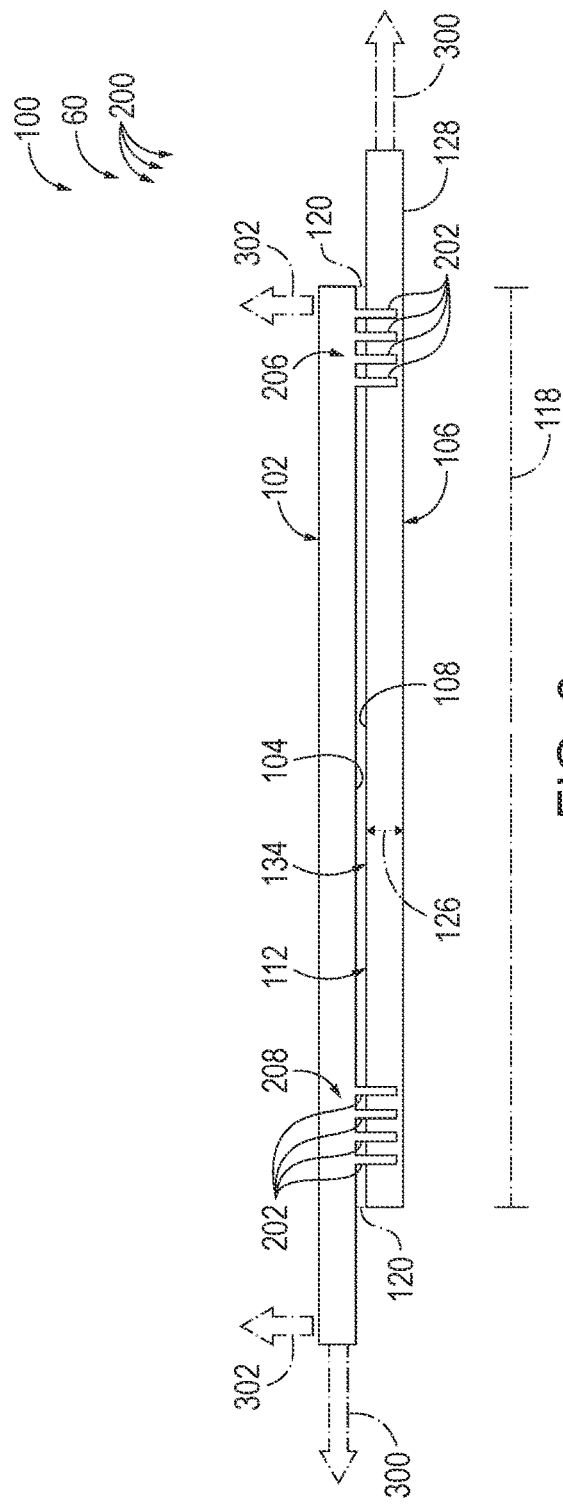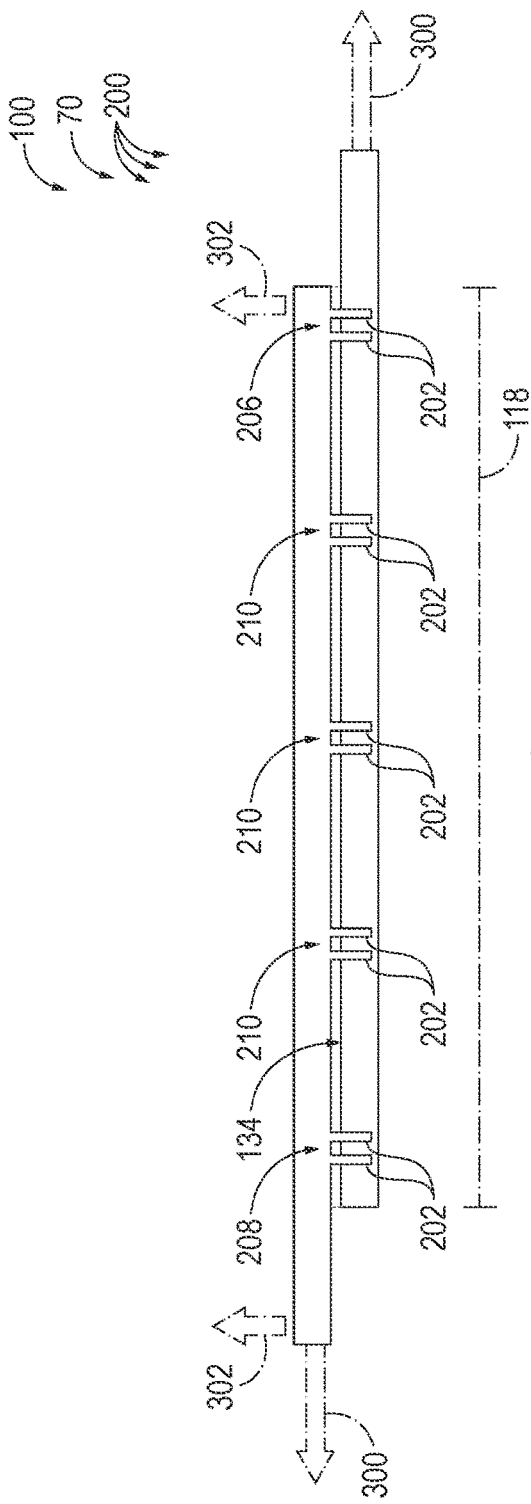

AEROSPACE COMPONENT JOINTS FOR AIRCRAFT AND RELATED METHODS

FIELD

The present disclosure relates to aerospace component joints for aircraft and related methods.

BACKGROUND

Aerospace parts often are joined together with one or more adhesive bonds that hold the aerospace parts in mechanical connection with one another. Typically, an adhesive bond between two aerospace parts includes an adhesive layer between bonding faces of the two aerospace parts and forming an adhesive bond with each of the bonding faces. During operable use, exterior forces are imparted on the aerospace components joined by the adhesive bond, and these forces may be transferred, or applied to, the adhesive bond in the form of various stresses, for example shear stress and peel stress. If the various stresses applied to the adhesive bond exceed its ultimate load capacity, the adhesive bond will fail. An adhesive bond failure can be partial, in which failures affect only a portion of the adhesive bond, and the aerospace parts remain mechanically connected by the adhesive bond. An adhesive bond failure also can be complete, in which failures affect the entirety of the adhesive bond, and the adhesive bond no longer provides a mechanical connection between the aerospace parts on its own. For both partial and complete bond failures, an adhesive bond typically requires some degree of maintenance before further use. To reduce the likelihood of bond failure, rivets traditionally may be installed along the edges of an aerospace adhesive bond to limit the load applied to the adhesive bond during operable use. The rivets also may allow the joint to withstand operable stresses after adhesive bond failure. While rivets provide redundancy to the adhesive bond in this way, they also can complicate bond failure detection for the same reason. Rivets also can be difficult to install and/or maintain, particularly when at least a portion of the adhesive bond is within a confined space.

SUMMARY

Aerospace component joints for aircraft, methods of preparing a component member for the aerospace component joints, and methods of forming the aerospace component joint are disclosed herein. The aerospace component joints comprise a first component member comprising a first bonding face, a second component member comprising a second bonding face, an adhesive layer, and one or more bond-enhancing features. The first bonding face overlaps with the second bonding face and is spaced apart from the second bonding face by a gap over a bonded area of the aerospace component joint. The adhesive layer substantially fills the gap and forms an adhesive bond between the first bonding face and the second bonding face. The one or more bond-enhancing features comprise at least one of a plurality of reinforcing protrusions or one or more adhesive-receiving recesses. The reinforcing protrusions are integral with the first component member, project from the first bonding face, extend through the adhesive layer, and penetrate into the second component member via the second bonding face. The one or more adhesive-receiving recesses are defined in one or both of the first bonding face and the second bonding face, and the adhesive layer substantially fills each adhesive-receiving recess.

The methods of preparing the component member comprise integrating one or more bond-enhancing features into the component member, which comprises forming the reinforcing protrusions to be integral with the component member and project from a bonding face of the component member and/or creating one or more adhesive-receiving recesses in the bonding face of the component member. The methods of forming the aerospace component joint comprise operably positioning the first bonding face and the second bonding face relative to one another, adhesive-bonding the first bonding face and the second bonding face to one another, and integrating the one or more bond-enhancing features into the aerospace component joint.

BRIEF DESCRIPTION OF THE DRAWINGS

FIG. 4 is a cross-sectional view showing examples of aerospace component joints comprising adhesive-receiving recesses according to the present disclosure.

FIG. 5 is a cross-sectional view showing additional examples of aerospace component joints comprising adhesive-receiving recesses according to the present disclosure.

FIG. 6 is a cross-sectional view showing an example aerospace component joint that comprises reinforcing protrusions according to the present disclosure.

FIG. 7 is a cross-sectional view showing another example aerospace component joint that comprises reinforcing protrusions according to the present disclosure.

DETAILED DESCRIPTION

Figure 1:
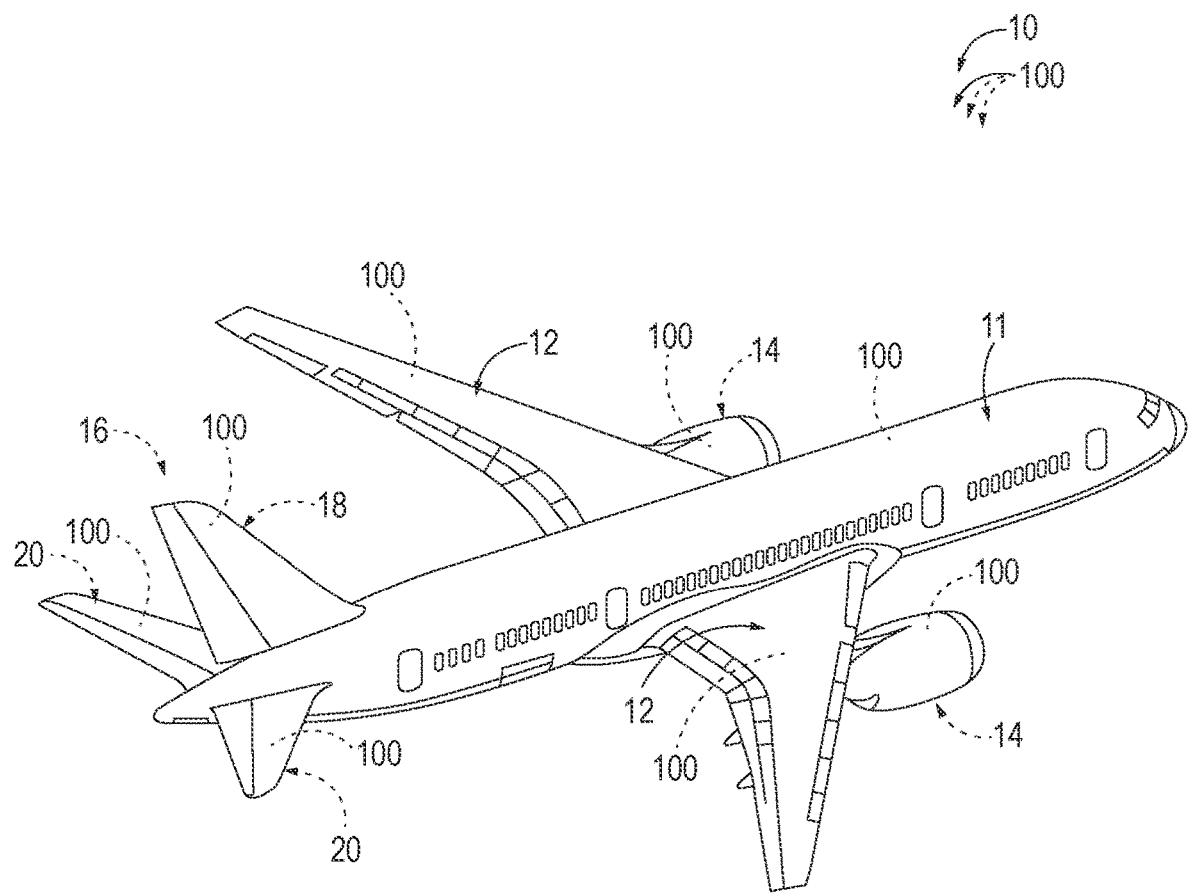
FIG. 1 is an illustration of an aircraft that comprises at least one aircraft component joint according to the present disclosure.

FIGS. 1-10 provide examples of aerospace component joints 100 for aircraft, aircraft 10 comprising at least one aerospace component joint 100, methods 500 of preparing a component member for an aerospace component joint 100, and methods 600 of forming an aerospace component joint 100 according to the present disclosure. Elements that serve a similar, or at least substantially similar, purpose are labelled with like numbers in each of FIGS. 1-10, and these elements may not be discussed herein with reference to each of FIGS. 1-10. Similarly, all elements may not be labeled in each of FIGS. 1-10, but reference numerals associated therewith may be utilized herein for consistency. Elements, components, and/or features that are discussed herein with reference to one or more of FIGS. 1-10 may be comprised in and/or utilized with any of FIGS. 1-10 without departing from the scope of the present disclosure.

Generally, in the figures, elements that are likely to be comprised in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the present disclosure. Additionally, in schematic FIGS. 2 and 3, virtual features, such as dimensions, boundaries, etc., that may be defined by aerospace component joints 100 are indicated in dot-dash lines, and these virtual features may or may not be optional to the illustrated embodiment.

FIG. 1 is an illustration of an aircraft 10 that comprises at least one aerospace component joint 100, and optionally a plurality of aerospace component joints 100, according to the present disclosure. Examples of aerospace component joints 100 are illustrated in FIGS. 2-8 and discussed in more detail herein with reference thereto. As shown in the examples of FIG. 1, aircraft 10 typically comprises at least a fuselage 11, wings 12 that are supported by the fuselage 11, and at least one aerospace component joint 100. In some examples, aircraft 10 also comprises at least one engine 14 operatively attached to fuselage 11, such as via a corresponding wing 12. In some examples, aircraft 10 further comprises a tail assembly 16 that is operatively attached to and/or at least partially defined by fuselage 11. Tail assembly 16 may comprise at least one vertical stabilizer 18 and/or at least one horizontal stabilizer 20. In some examples, fuselage 11, wing(s) 12, engine(s) 14, tail assembly 16, vertical stabilizer 18, and/or horizontal stabilizer 20, comprise a corresponding aerospace component joint 100 and/or comprise at least two component members that are joined by aerospace component joint 100. Likewise, some examples of aircraft 10 comprise at least one attachment structure for operatively attaching two or more of the fuselage 11, wing(s) 12, engine(s) 14, vertical stabilizer(s) 18, and/or horizontal stabilizer(s) 20. In some such examples, the attachment structure comprises at least one aerospace component joint 100 and/or comprises at least two component members joined together by aerospace component joint 100.

While FIG. 1 illustrates a fixed wing aircraft, other apparatuses are within the scope of the present disclosure, and the present disclosure is not limited to aircraft and aircraft applications. Illustrative non-exclusive examples of other apparatuses that are suitable to be constructed with aerospace component joints 100 comprise, but are not limited to, spacecraft, watercraft, land vehicles, structural towers, rotorcraft, tilt-wing craft, missiles, and/or rockets.

Figure 2:
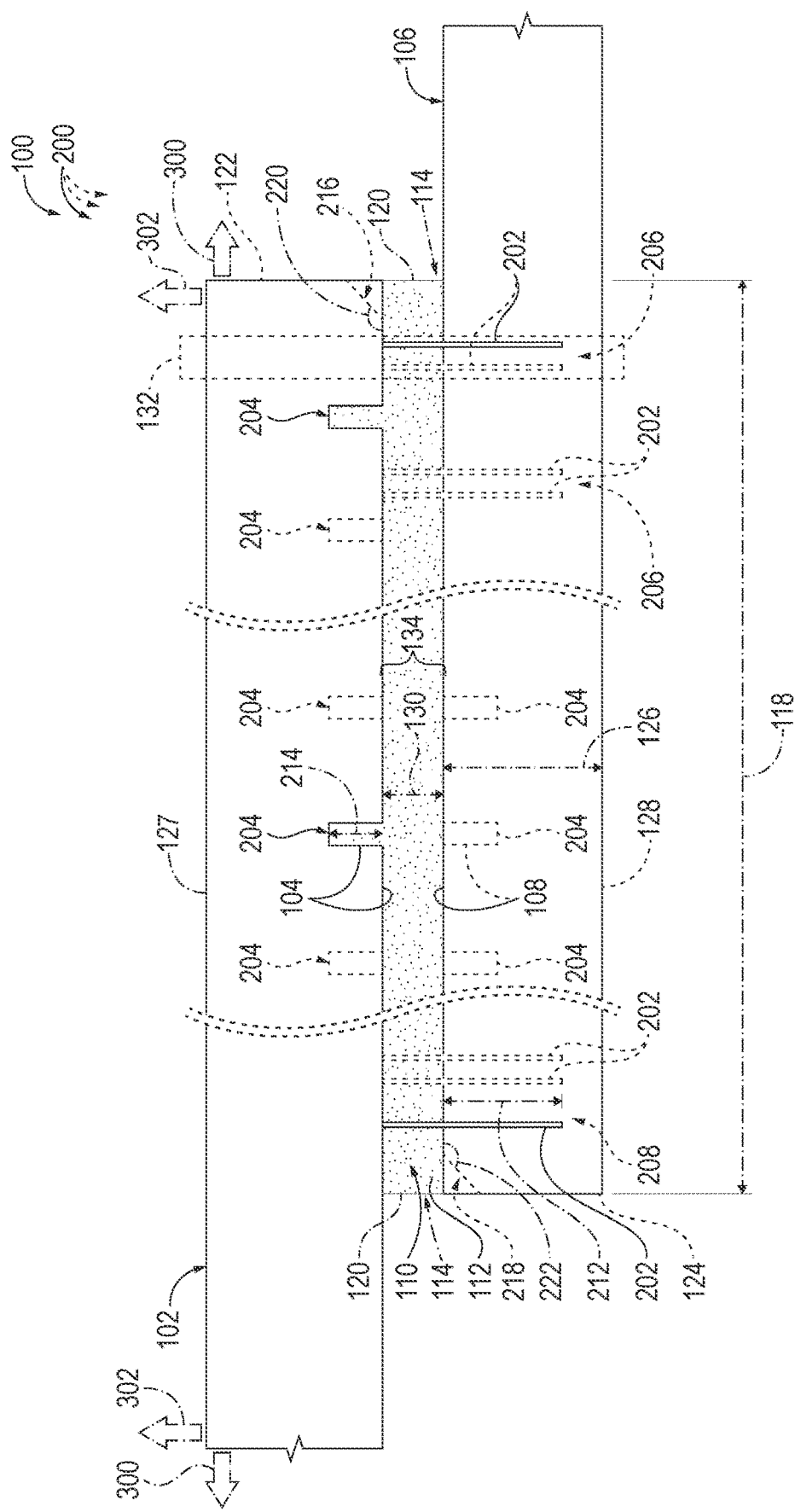
FIG. 2 is a schematic cross-sectional view representing examples of aerospace component joints according to the present disclosure.
Figure 3:
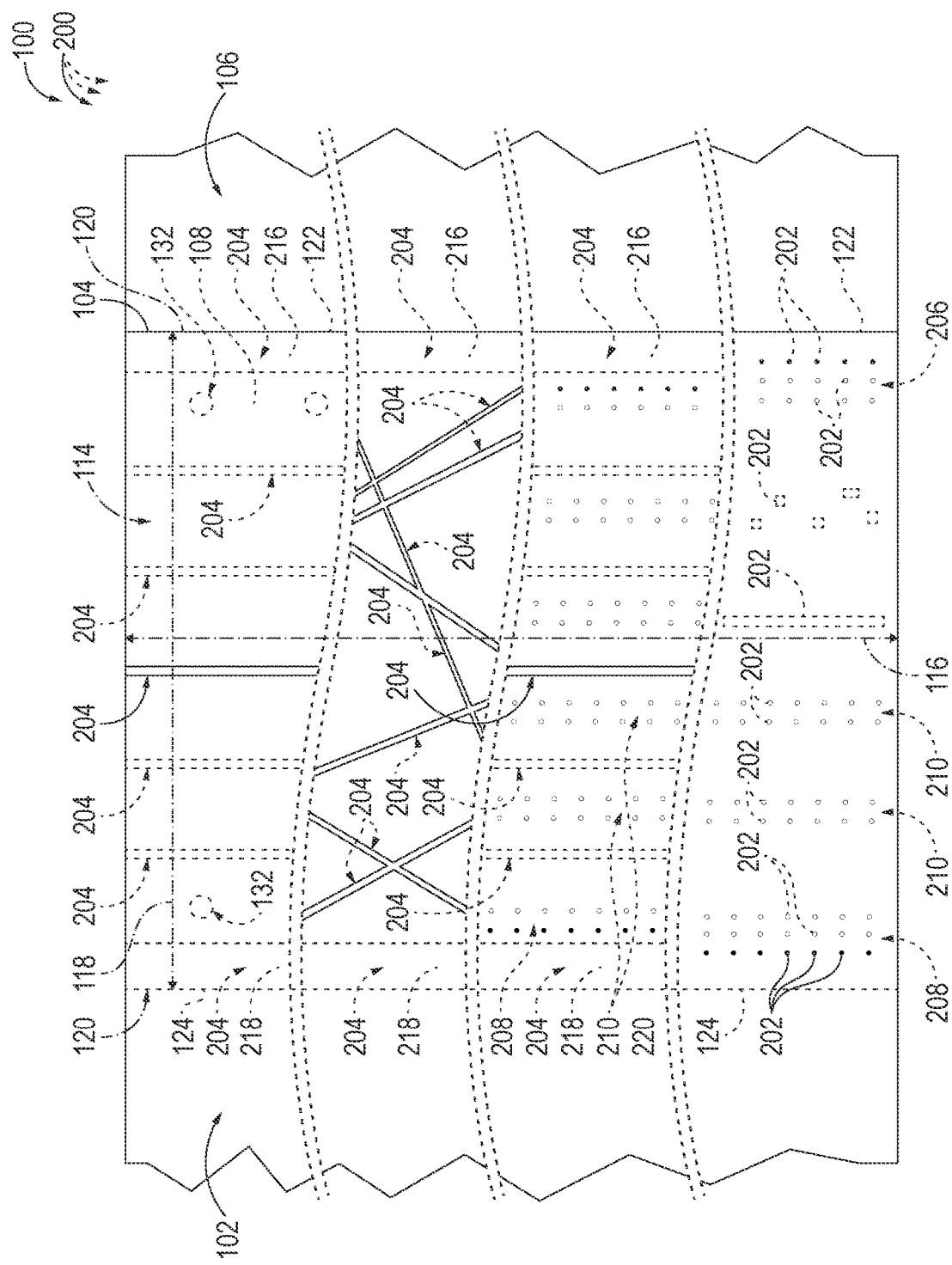
FIG. 3 is a schematic plan view representing examples of aerospace component joints according to the present disclosure.

FIGS. 2 and 3 are schematic representations showing examples of aerospace component joints 100 for aircraft, such as for aircraft 10 of FIG. 1, according to the present disclosure. Specifically, FIG. 2 is a schematic cross-sectional view of aerospace component joints 100 and FIG. 3 is a schematic plan view of aerospace component joints 100. With reference to the examples of FIGS. 2 and 3, aerospace component joints 100 comprise a first component member 102 comprising a first bonding face 104 and a second component member 106 comprising a second bonding face 108. First bonding face 104 and second bonding face 108 overlap one another along a bonded area 114, and first bonding face 104 and second bonding face 108 are separated from one another along the bonded area 114 by a gap 110. Aerospace component joints 100 further comprise an adhesive layer 112 substantially filling gap 110 and forming an adhesive bond 134 between first bonding face 104 and second bonding face 108. Thus, aerospace component joint 100 additionally or alternatively may be referred to as an adhesive-bonded aerospace component joint. As defined herein, the adhesive layer 112 "substantially filling gap 110" refers to the adhesive layer 112 filling at least 90% of the volume of the gap 110.

Aerospace component joints 100 further comprise one or more bond-enhancing features 200 that may be configured to enhance the strength, durability, and/or longevity of aerospace component joint 100 and/or reduce the propensity for failures to occur within and/or propagate through adhesive bond 134. As defined herein, adhesive layer 112, the bond between adhesive layer 112 and first bonding face 104, and the bond between adhesive layer 112 and second bonding face 108 collectively form the adhesive bond 134 between first component member 102 and second component member 106.

The one or more bond-enhancing features 200 comprise at least one of a plurality of reinforcing protrusions 202 or one or more adhesive-receiving recesses 204. Stated differently, in some examples, bond-enhancing features 200 only comprise reinforcing protrusions 202. In other examples, bond-enhancing features 200 only comprise one or more adhesive-receiving recesses 204. In yet other examples, bond-enhancing features 200 comprise each of reinforcing protrusions 202 and one or more adhesive-receiving recesses 204.

When comprised in aerospace component joint 100, reinforcing protrusions 202 are integral with first component member 102, project from first bonding face 104, extend through adhesive layer 112, and penetrate into second component member 106 through second bonding face 108. Thus, reinforcing protrusions 202 differ from traditional fasteners at least in that reinforcing protrusions 202 are integral and/or form a portion of first component member 102.

When comprised in aerospace component joint 100, the one or more adhesive-receiving recesses 204 are defined in one or both of first bonding face 104 and second bonding face 108, and adhesive layer 112 substantially fills each adhesive-receiving recess 204. In other words, each adhesive-receiving recess 204 may be described as forming, or defining, a portion of the gap 110, and each adhesive-receiving recess 204 is configured to receive a corresponding portion of adhesive layer 112. As defined herein, adhesive layer 112 "substantially" filling each adhesive-receiving recess 204 refers to the adhesive layer 112 filling at least 90% of the volume of each adhesive-receiving recess 204.

Aerospace component joint 100 is formed between any suitable component members. As an example, first component member 102 and second component member 106 may form portions of a connecting structure in an aircraft. As another example, second component member 106 may form a portion of the skin of an aircraft and first component member 102 may be, or form a portion of, a structural component that supports the aircraft skin, for example, a stringer, a rib, a spar former, and/or a longeron.

First component member 102 and second component member 106 are formed from any suitable material or materials. In some examples, first component member 102 and second component member 106 are formed of one or more of the same materials, and in other examples, first component member 102 and second component member 106 are formed of one or more different materials. In some examples, first component member 102 is formed of a metal or a metal alloy, and second component member 106 is formed of a plastic material. In other examples, first component member 102 and second component member 106 each are formed of a plastic material. In some examples, the plastic material that forms first component member 102 and/or second component member 106 is a fiber-reinforced plastic material, or a fiber-reinforced composite material. Examples of suitable plastic materials include thermoplastic polymers, thermoset polymers, resins, cross-linking resins, epoxy polymers, melt polyaryletherketone (PAEK) polymers, polyphenylene sulfide (PPS), polyether ether ketone (PEEK), and/or polyetherketoneketone (PEKK). Examples of suitable reinforcing fibers include woven fibers, continuous fibers, chopped fibers, reinforcing particles, carbon fibers, glass fibers, boron fibers, ultra-high molecular weight polyethylene fibers, aramid fibers, and/or para-aramid fibers (e.g., KEVLAR™). Examples of suitable metals and metal alloys for forming first component member 102 comprise aluminum, titanium, and aluminum or aluminum alloys comprising manganese, silicon, scandium, zinc, magnesium, copper, and/or combinations thereof. In more general terms, first component member 102 and second component member 106 may be formed of types of fiber-reinforced plastic materials, metals, or metal alloys that are typically utilized in aircraft and/or aerospace applications, as will be understood by a person of ordinary skill in the art.

For examples in which first component member 102 is formed from a metal, or metal alloy, and second component member 106 is formed of a plastic material, aerospace component joint 100 may be referred to as a metal-to-composite joint. For examples in which first component member 102 and second component member 106 each are formed of a fiber-reinforced plastic material, aerospace component joint 100 may be referred to as a composite-to-composite joint.

Adhesive layer 112 also comprises any suitable adhesive, such as an adhesive that is typically utilized in aircraft and/or aerospace applications, as will be understood by a person of ordinary skill in the art. For examples in which first component member 102 and second component member 106 are both formed from plastic materials and/or fiber-reinforced plastic materials, the adhesive for adhesive layer 112 may be a plastic-to-plastic, or composite-to-composite adhesive. For examples in which first component member 102 is formed of a metal, or a metal alloy, and second component member 106 is formed of a plastic material, or a fiber-reinforced plastic material, the adhesive may be a metal-to-plastic, or a metal-to-composite adhesive. More specific examples of suitable adhesives comprise resins, an epoxy resin, epoxy adhesives, two-part adhesives, vulcanizing silicone rubber adhesives, polysulfide adhesives, manganese dioxide cured adhesives, sealants, and/or a curable composite material.

Aerospace component joint 100 may comprise a variety of conformations, and the particular conformation of aerospace component joint 100 typically is at least partially determined by the component members of the aircraft that aerospace component joint 100 is formed between. For example, while FIG. 2 schematically illustrates first component member 102 and second component member 106 as being planar, or collinear, along aerospace component joint 100, first component member 102 and second component member 106 additionally or alternatively may be curved, shaped, non-planar, and/or non-linear along aerospace component joint 100 without departing from the scope of the present disclosure.

In some examples, first bonding face 104 and second bonding face 108 extend generally parallel to one another along the bonded area 114. As referred to herein, a first element extending "generally parallel to" a second element refers to the first element extending within 5 degrees of parallel to the second element. Also in this context, the first bonding face 104 extending generally parallel to the second bonding face 108 refers to the portions of the first bonding face 104 and the second bonding face 108 that are not modified by bond-enhancing features 200.

Bonded area 114 may be defined as an area of first bonding face 104 over which adhesive layer 112 is bonded to first bonding face 104 or an area of second bonding face 108 over which adhesive layer 112 is bonded to second bonding face 108. In particular, aerospace component joint 100 defines a width 118 that may be described as the extent of overlap between first bonding face 104 and second bonding face 108. Aerospace component joint 100 also defines a length 116 that is measured transverse to width 118 and that represents the distance, or length, over which first bonding face 104 and second bonding face 108 are overlapped and adhesively bonded to one another. With this in mind, bonded area 114 may be defined by the width 118 and length 116 of aerospace component joint 100.

In some examples, adhesive layer 112 and/or gap 110 extend between and/or define a pair of longitudinal boundaries 120 that run parallel to the length 116 of aerospace component joint 100 and that are spaced apart from one another by width 118. For example, each longitudinal boundary 120 may be defined by an edge of first component member 102 or second component member 106 or a plane along which first bonding face 104 or second bonding face 108 diverge from extending generally parallel to one another. In more specific examples, first component member 102 comprises a first joint edge 122 that defines one of the longitudinal boundaries 120, and second component member 106 comprises a second joint edge 124 that is opposed to first joint edge 122 and that defines the other longitudinal boundary 120. In such examples, width 118 is defined between first joint edge 122 and second joint edge 124.

Bond-enhancing features 200 are distributed in any suitable manner about aerospace component joint 100 and/or bonded area 114 thereof. As discussed in more detail herein, various stresses are applied to aerospace component joint 100 during operable use thereof (e.g., during flight operations of the aircraft) and bond-enhancing features 200 are distributed about aerospace component joint 100 in a manner that strengthens aerospace component joint 100 against the various stresses, increases the yield strength of aerospace component joint 100, and/or reduces the propensity for failures to form within and/or propagate through adhesive bond 134.

More specific examples of stresses applied to aerospace component joint 100 during operable use comprise shear stress 300 and peel stress 302. As schematically represented in FIG. 2, shear stress 300 generally is aligned with width 118 and directed away from bonded area 114, while peel stress 302 generally is aligned with a nominal thickness 130 of adhesive layer 112 and directed away from bonded area 114. In some examples, shear stress 300 urges first component member 102 and second component member 106 away from one another in respective directions that reduce the magnitude of width 118. In some examples, peel stress 302 urges first component member 102 and second component member 106 away from one another in respective directions that increase the separation between first bonding face 104 and second bonding face 108.

In some examples, reinforcing protrusions 202 are configured to reduce, and/or disposed along aerospace component joint 100 in a manner that reduces, shear stress 300 and/or peel stress 302 applied to adhesive bond 134. In some examples, shear stress 300 and/or peel stress 302 are concentrated in adhesive bond 134 adjacent to, or towards, longitudinal boundaries 120. With this in mind, in some examples, reinforcing protrusions 202 comprise one or more reinforcing protrusions 202 disposed adjacent to either or both of longitudinal boundaries 120. In some examples, reinforcing protrusions 202 are distributed along at least a substantial portion of the length of aerospace component joint 100, such as to reduce peel stress 302 and/or shear stress 300 applied to adhesive bond 134 along at least the substantial portion of the length of aerospace component joint 100.

In more specific examples, reinforcing protrusions 202 comprise a first subset 206 of reinforcing protrusions 202 disposed adjacent to, and interior of first joint edge 122, or a first longitudinal boundary 120, and a second subset 208 of reinforcing protrusions 202 disposed adjacent to, and interior of, second joint edge 124, or a second longitudinal boundary 120. In this context, an element being spaced "interior of" first joint edge 122, second joint edge 124, or a longitudinal boundary 120 refers to the element being spaced towards the lateral center of the gap 110 or towards the other longitudinal boundary 120. Also in this context, first subset 206 of reinforcing protrusions 202 being disposed "adjacent to" first joint edge 122 or the first longitudinal boundary 120 refers to the first subset 206 of reinforcing protrusions 202 being positioned within 20% of width 118 from first joint edge 122 or the first longitudinal boundary 120. Likewise, second subset 208 of reinforcing protrusions 202 is positioned within 20% of width 118 from second joint edge 124 or the second longitudinal boundary 120. In other words, first subset 206 and second subset 208 of reinforcing protrusions 202 are spaced apart from one another along the width 118 of aerospace component joint 100.

In some examples, first subset 206 of reinforcing protrusions 202 and/or second subset 208 of reinforcing protrusions 202 comprise at least one row, and optionally a plurality of rows, of reinforcing protrusions 202 that are distributed along a substantial portion of the length 116 of aerospace component joint 100. For examples in which first subset 206 and/or second subset 208 comprises a plurality of rows of reinforcing protrusions 202, the rows of a given subset may be spaced apart from one another about width 118 and optionally extend in parallel along length 116. That said, the rows of a particular subset typically are positioned closer to one another than are first subset 206 and second subset 208.

In some examples, reinforcing protrusions 202 are distributed along at least a substantial portion of width 118 of aerospace component joint 100, such as to reduce peel stress 302 and/or shear stress 300 along at least the substantial portion of width 118. In some examples, reinforcing protrusions 202 are evenly distributed along width 118. Alternatively, in some examples, reinforcing protrusions 202 comprise at least one, and optionally a plurality of, additional subsets 210 of reinforcing protrusions 202 disposed between first subset 206 and second subset 208 of reinforcing protrusions 202. In some examples, each additional subset 210 of reinforcing protrusions 202 comprises at least one row, and optionally a plurality of rows, of reinforcing protrusions 202 disposed along a substantial portion of length 116. In some examples, additional subsets 210 of reinforcing protrusions 202 are spaced apart from one another, and optionally evenly spaced apart from one another, along width 118.

As seen in FIGS. 2 and 3, aerospace component joints 100 may comprise fasteners 132, such as rivets, that are configured to reduce shear stress 300 and peel stress 302 applied to adhesive bond 134. Typically, fasteners 132, or more specifically rivets, are positioned adjacent to longitudinal boundaries 120, and extend through first component member 102, gap 110, and second component member 106. First component member 102 defines a first counter face 127 opposed to first bonding face 104, second component member 106 defines a second counter face 128 opposed to second bonding face 108. Each fastener 132 typically engages first counter face 127 and second counter face 128 to retain first component member 102 and second component member 106 together. Unlike fasteners 132, any given reinforcing protrusion 202 protrudes from first bonding face 104 and may extend entirely within gap 110 and second component member 106. In other words, reinforcing protrusions 202 may not extend through first counter face 127 or second counter face 128 as do fasteners 132.

Each reinforcing protrusion 202 is integral with first bonding face 104 in any suitable manner. In some examples, reinforcing protrusions 202 are formed on and/or additively manufactured on first bonding face 104. In some examples, reinforcing protrusions 202 are welded, sintered, and/or bonded on first bonding face 104. In some examples, reinforcing protrusions 202 are formed together with first component member 102 in a concerted process, for example, by molding first component member 102 and reinforcing protrusions 202 as portions of first component member 102. In other examples, reinforcing protrusions 202 are formed by a subtractive manufacturing process, such as by machining, milling, and/or embossing first bonding face 104 to form reinforcing protrusions 202. In view of the above, reinforcing protrusions typically are formed of one or more of the same materials as first component member 102 and/or one or more materials that are compatible with welding, sintering, and/or bonding to first component member 102.

In some examples, bond-enhancing features 200 comprise reinforcing protrusions 202 when first component member 102 is formed of a metal, or a metal alloy, and second component member 106 is formed of a plastic material, or a fiber-reinforced plastic material. As discussed in more detail herein, in some examples, such a configuration of aerospace component joint 100 permits reinforcing protrusions to be penetrated into second component member 106 during assembly of aerospace component joint 100 without pre-forming bores within second component member 106 to receive reinforcing protrusions 202.

Reinforcing protrusions 202 also are conformed in any suitable manner. As examples, reinforcing protrusions 202 may comprise a plurality of pins, a plurality of columnar projections, and/or a plurality of ridges. Each reinforcing protrusion 202 defines a cross-sectional shape taken in a plane parallel to first bonding face 104, and examples of suitable cross-sectional shapes for each reinforcing protrusion 202 comprise a circle, a square, a rectangle, a rectangle elongated along length 116, a cross, a polygon, and/or tubular or hollow versions thereof. For some examples in which reinforcing protrusions 202 comprise a plurality of ridges, each ridge is elongate parallel to length 116 and optionally extends along at least a substantial portion of length 116. In some more specific examples, each ridge may replace one of the rows of reinforcing protrusions 202 discussed herein in connection to first subset 206, second subset 208, and additional subset 210 of reinforcing protrusions 202.

In some examples, each reinforcing protrusion 202 is dimensioned to protrude into second component member 106 by a selected protrusion depth 212. In particular, second component member 106 defines a second member thickness 126 along bonded area 114 that is measured between second bonding face 108 and second counter face 128. In some examples, each reinforcing protrusion 202 is dimensioned such that protrusion depth 212 thereof is a threshold fraction of second member thickness 126 along bonded area 114, with examples of this threshold fraction comprising at least 60%, at least 65%, at least 70%, at least 75%, at least 80%, at least 85%, at least 90% at least 95%, at least 98%, at most 75%, at most 80%, at most 85%, at most 90%, at most 95%, at most 98%, and/or at most 99%.

Each reinforcing protrusion 202 also defines a cross-sectional area that is measured in a plane parallel to first bonding face 104, and the plurality of reinforcing protrusions 202 define a cumulative cross-sectional area that is a sum of the cross-sectional areas of all reinforcing protrusions 202. Similarly, fasteners 132 of an otherwise equivalent conventional aerospace component joint each define a fastener cross-sectional area that is measured in a plane parallel to first bonding face 104 and collectively define a cumulative fastener cross-sectional area that is the sum of the fastener cross-sectional areas of all fasteners 132. As referred to herein, the otherwise equivalent conventional aerospace component joint comprises all of the same features, functions, dimensions, elements, etc. as aerospace component joint 100, except that the otherwise equivalent conventional aerospace component joint comprises fasteners 132 and does not comprise bond-enhancing features 200. In some examples, reinforcing protrusions 202 are configured such that the cumulative cross-sectional area thereof is at least substantially the same as the cumulative fastener cross-sectional area of the otherwise equivalent conventional aerospace component joint.

In some examples, each reinforcing protrusion 202 comprises a shear strength, and the plurality of reinforcing protrusions collectively comprise a cumulative shear strength that corresponds to the shear strength multiplied by the cumulative cross-sectional area. In some examples, reinforcing protrusions 202 are configured such that the cumulative shear strength thereof is equal to or greater than a limit shear load of the aerospace component joint 100. As defined herein, "the limit shear load" refers to the maximum shear load that is applied to aerospace component joint 100 during operable use in the aircraft, for example, during flight operations. The limit shear load may vary based on the particular location and/or function of aerospace component joint 100. Thus, stating the above in slightly different terms, in some examples, reinforcing protrusions 202 are configured to possess a cumulative shear strength that is equal to or greater than the maximum load applied to aerospace component joint 100 during operable use. In some examples, the cumulative shear strength of reinforcing protrusions 202 is increased by increasing the number of reinforcing protrusions, increasing the cross-sectional area of each reinforcing protrusion, and/or increasing the shear strength of the material that forms each reinforcing protrusion 202.

With continued reference to FIGS. 2 and 3, each adhesive-receiving recess 204 may be configured to create a corresponding region of increased thickness in adhesive layer 112. In some examples, the one or more regions of increased thickness in the adhesive layer 112 created by the one or more adhesive-receiving recesses 204 allows adhesive bond 134 to withstand larger shear stress 300 loads and/or larger peel stress 302 loads before failure. Additionally or alternatively, in some examples, the one or more regions of increased thickness in adhesive layer 112 created by adhesive-receiving recess(es) 204 causes cracks and/or failures within adhesive layer 112 to terminate in adhesive-receiving recess(es) 204. In other words, adhesive-receiving recess(es) 204 may be configured to guide cracks and/or failures in adhesive layer 112 to terminate in adhesive-receiving recess(es) 204 and/or prevent the propagation of the cracks or failures through adhesive layer 112.

More specifically, in some examples, adhesive layer 112 comprises a flexibility or elasticity that is greater than the flexibility or elasticity of first component member 102 and/or second component member 106. In some examples, by creating one or more regions of increased thickness in adhesive layer 112, adhesive-receiving recess(es) 204 create one or more corresponding regions of increased flexibility, or strain tolerance, within the adhesive bond 134. In other words, each adhesive-receiving recess 204 may reduce stress concentration within adhesive bond 134 and/or distribute stresses within adhesive bond 134. In this way, adhesive-receiving recess(es) 204 may increase the shear strength and/or peel strength of adhesive bond 134. Additionally or alternatively, adhesive-receiving recess(es) may create one or more relief regions that prevent complete bond failure from occurring in adhesive bond 134.

As perhaps best seen in FIG. 2, adhesive layer 112 comprises a nominal thickness 130 that is measured between first bonding face 104 and second bonding face 108 outside of the one or more adhesive-receiving recesses 204. Each adhesive-receiving recess 204 defines a recess depth 214 that is measured parallel to nominal thickness 130. In some examples, recess depth 214 of each adhesive-receiving recess 204 is greater than nominal thickness 130 of adhesive layer 112. In such examples, the thickness of adhesive layer 112 along each adhesive-receiving recess 204 is greater than twice the nominal thickness 130 of adhesive layer 112. In some examples, each adhesive-receiving recess 204 is dimensioned such that recess depth 214 thereof is a threshold fraction of nominal thickness 130 of adhesive layer 112. More specific examples of the threshold fraction of recess depth 214 to nominal thickness 130 comprise at least 100%, at least 200%, at least 300%, at least 400%, at least 500%, at least 600%, at least 700%, at least 800%, at least 900%, at most 300%, at most 400%, at most 500%, at most 600%, at most 700%, at most 800%, at most 900%, and/or at most 1000%.

The one or more adhesive-receiving recesses 204 are distributed along aerospace component joint 100 in any suitable manner. In some examples, adhesive-receiving recess(es) 204 are disposed and/or extend along a substantial portion of the length 116 of aerospace component joint 100, such as to enhance adhesive bond 134 as discussed herein along the substantial portion of length 116. In this context, "the substantial portion" of length 116 is utilized herein to refer to at least 90% of length 116. In some examples, aerospace component joint 100 comprises a plurality of adhesive-receiving recesses 204. In some such examples, one or more adhesive-receiving recesses 204 are defined in first bonding face 104 and second bonding face 108. In some examples, aerospace component joint 100 comprises a plurality of adhesive-receiving recesses 204 defined in first bonding face 104 and optionally distributed along at least a substantial portion of width 118. In some examples, aerospace component joint 100 comprises a plurality of adhesive-receiving recesses 204 defined in second bonding face 108 and optionally distributed along at least a substantial portion of width 118.

Each adhesive-receiving recess 204 comprises any suitable conformation. In some examples, adhesive-receiving recess 204 comprises a groove formed in first bonding face 104 or second bonding face 108. In some examples, the groove extends along the substantial portion of length 116.

In some examples, the groove extends at a fixed distance between longitudinal boundaries 120 as it extends along the substantial portion of length 116. In other examples, the groove extends in a non-linear conformation, such as an undulating conformation and/or a zig-zag conformation, along the substantial portion of length 116. In some examples, adhesive-receiving recesses 204 comprise a plurality of grooves defined in first bonding face 104 and second bonding face 108 and optionally distributed along the width 118 of aerospace component joint 100. In some such examples, the grooves are spaced apart from one another about the width 118. In other examples, the grooves intersect one another as they extend along first bonding face 104 and/or second bonding face 108. Additionally or alternatively, in some examples, adhesive-receiving recesses 204 comprise a plurality of spaced-apart divots, indents, and/or craters distributed along first bonding face 104 and/or second bonding face 108.

In some examples, first bonding face 104 and/or second bonding face 108 comprises a textured conformation that defines the plurality of adhesive-receiving recesses 204. As examples, first bonding face 104 and/or second bonding face 108 may be machined, engraved, embossed, milled, and/or otherwise provided with a crosshatched pattern, a dimpled pattern, and/or a randomly roughened conformation that defines or forms the plurality of adhesive-receiving recesses 204 therein.

In some examples, adhesive-receiving recess(es) 204 comprise one or more edge recesses. In some examples, each edge recess is configured to increase the shear strength and/or the peel strength of adhesive bond 134 adjacent to a respective longitudinal boundary 120, such as in the manner discussed herein generally for adhesive-receiving recesses 204. More specifically, in some examples, adhesive-receiving recess(es) 204 comprise a first edge recess 216 defined in first bonding face 104 and extending interiorly from first joint edge 122 of first component member 102. In this context, the term "interiorly" is utilized to refer to towards the lateral center of aerospace component joint 100 or towards the other longitudinal boundary 120. In some such examples, first bonding face 104 along first edge recess 216 extends towards second bonding face 108 and forms a first edge recess angle 220 with the portion of first bonding face 104 that is immediately adjacent to first edge recess 216. As examples, first edge recess angle 220 may be at most 175 degrees (°), at most 170°, at most 160°, at most 150°, at most 140°, at most 130°, at most 135° at most 120°, at most 110°, at least 150°, at least 140°, at least 130°, at least 120°, at least 110°, and/or at least 100°.

In some examples, adhesive-receiving recess(es) 204 comprise a second edge recess 218 defined in second bonding face 108 and extending interiorly from second joint edge 124 of second component member 106. In some such examples, second bonding face 108 along second edge recess 218 forms a second edge recess angle 222 with the portion of second bonding face 108 that is immediately adjacent to second edge recess 218. As examples, second edge recess angle 222 may be at most 175°, at most 170°, at most 160°, at most 150°, at most 140°, at most 130°, at most 135° at most 120°, at most 110°, at least 150°, at least 140°, at least 130°, at least 120°, at least 110°, and/or at least 100°. In some examples, adhesive-receiving recesses 204 comprise both of first edge recess 216 and second edge recess 218.

As mentioned, in some examples, bond-enhancing features 200 comprise both of reinforcing protrusions 202 and adhesive-receiving recess(es) 204. In such examples, adhesive-receiving recesses 204 and reinforcing protrusions 202 are distributed about aerospace component joint 100 in any suitable relationship to one another. In some examples, adhesive-receiving recesses 204 and reinforcing protrusions 202 are distributed such that reinforcing protrusions 202 extend completely outside of adhesive-receiving recesses 204. In other words, reinforcing protrusions 202 may not extend from within, or into, adhesive-receiving recesses 204. In some examples, adhesive-receiving recesses 204 and reinforcing protrusions 202 are disposed in an alternating relationship along the width 118 of aerospace component joint 100.

Figure 8:
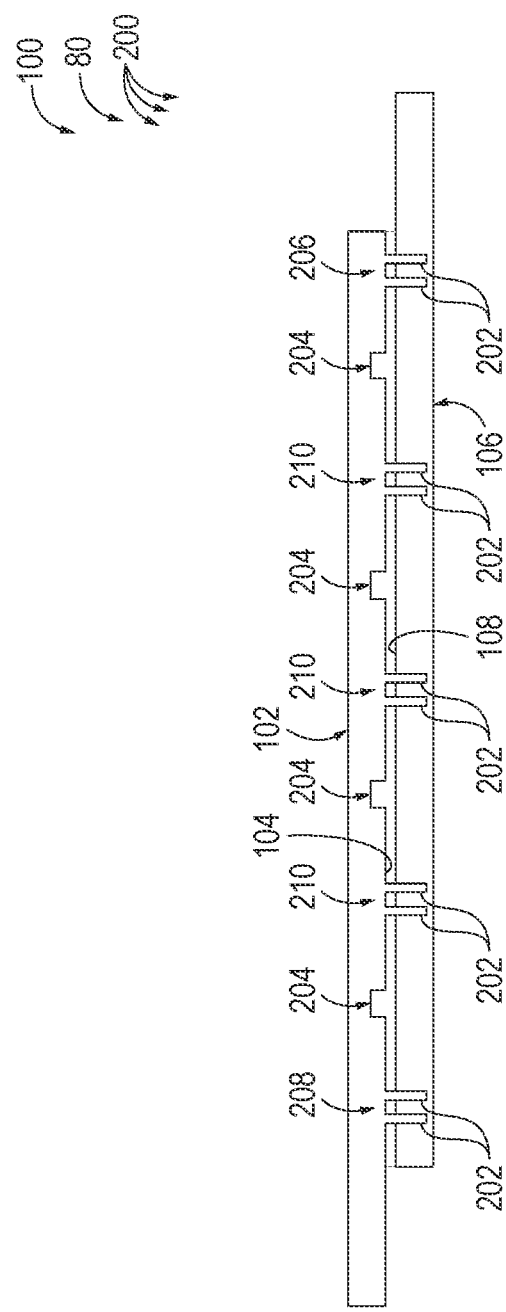
FIG. 8 is a cross-sectional view showing an example aerospace component joint that comprises reinforcing protrusions and adhesive-receiving recesses according to the present disclosure.

FIGS. 4-8 are cross-sectional views providing illustrative, non-exclusive examples of aerospace component joints 100 according to the present disclosure. The cross-sectional views of FIGS. 4-8 are taken in a plane parallel to the width 118 and normal to the length 116 of the illustrated aerospace component joint 100. Specifically, FIG. 4 provides an illustrative non-exclusive example of aerospace component joint 100 that is indicated at and referred to herein as aerospace component joint 40, FIG. 5 provides an illustrative non-exclusive example of aerospace component joint 100 that is indicated at and referred to herein as aerospace component joint 50, FIG. 6 provides an illustrative non-exclusive example of aerospace component joint 100 that is indicated at and referred to herein as aerospace component joint 60, FIG. 7 provides an illustrative non-exclusive example of aerospace component joint 100 that is indicated at and referred to herein as aerospace component joint 70, and FIG. 8 provides an illustrative non-exclusive example of aerospace component joint 100 that is indicated at and referred to herein as aerospace component joint 80. Example aerospace component joints 40, 50, 60, 70 and 80 are non-exclusive and do not limit aerospace component joints 100 to the illustrated embodiments of FIGS. 4-8. That is, aerospace component joints may incorporate any number of the various aspects, configurations, characteristics, properties, etc. of aerospace component joints 100 according to schematic FIGS. 2-3, and/or the examples of FIGS. 4-8, as well as variants thereof, without requiring the inclusion of all such aspects, configurations, characteristics, properties, etc. For the purpose of brevity, each discussed component, part, portion, aspect, region, etc. or variants thereof may not be discussed, illustrated, and/or labeled with respect to aerospace component joints 40, 50, 60, 70 and 80; however, it is within the scope of the present disclosure that the discussed features, variants, etc. of aerospace component joints 100 of FIGS. 2 and 3 may be comprised and/or utilized with aerospace component joints 40, 50, 60, 70 and 80. Likewise, the specific illustrated and discussed aspects of aerospace component joints 40, 50, 60, 70 and 80 may be comprised in and/or utilized with other aerospace component joints 100 according to the present disclosure.

FIGS. 4 and 5 illustrate examples in which bond-enhancing features 200 comprise adhesive-receiving recesses 204. With initial reference to FIG. 4, aerospace component joint 40 comprises first component member 102 and second component member 106. In some examples, first component member 102 is formed of a metal, or metal alloy, and second component member 106 is formed of a fiber-reinforced plastic material. In other examples, first component member 102 and second component member 106 each are formed of a fiber-reinforced plastic material. Adhesive layer 112 fills gap 110 between first bonding face 104 and second bonding face 108 and forms adhesive bond 134 therebetween. Aerospace component joint 40 further comprises a plurality of adhesive-receiving recesses 204 defined in first bonding face 104. Here, adhesive-receiving recesses 204 are evenly spaced apart along the width 118 of aerospace component joint 40. In some examples, each adhesive-receiving recess 204 comprises a groove that extends along at least a substantial portion of the length of aerospace component joint 40.

In some examples, aerospace component joint 40 further includes fasteners 132 positioned adjacent to, and spaced interiorly of, longitudinal boundaries 120. Each fastener 132 extends through a bore formed in first component member 102, adhesive layer 112, and second component member 106 and engages first counter face 127 and second counter face 128 to retain first component member 102 and second component member 106 to one another.

Under operative conditions, external forces apply shear stress 300 and peel stress 302 to aerospace component joint 40 via first component member 102 and second component member 106. Adhesive-receiving recesses 204 increase loads of shear stress 300 and peel stress 302 that can be applied to adhesive bond 134 before failure. Adhesive-receiving recesses 204 also prevent failures in adhesive bond 134 from propagating through the width 118 of aerospace component joint 40, such as discussed herein.

Turning to FIG. 5, example aerospace component joints 50 are similar to aerospace component joints 40; however, adhesive-receiving recesses 204 in aerospace component joints 50 further comprise first edge recess 216 and second edge recess 218. First edge recess 216 and second edge recess 218 respectively extend inwardly from first joint edge 122 and second joint edge 124. First edge recess 216 and second edge recess 218 each extend substantially along the length of aerospace component joint 50. First edge recess 216 and second edge recess 218 define portions of gap 110 and are substantially filled with adhesive layer 112 to create regions of increased thickness in adhesive layer 112 adjacent to longitudinal boundaries 120 of aerospace component joint 50. First edge recess 216 and second edge recess 218 thereby provide additional increased flexibility, or strain tolerance, along the longitudinal edge regions of aerospace component joint 50, where shear stress 300 and peel stress 302 may be concentrated. In this way, first edge recess 216 and second edge recess 218 permit aerospace component joint 50 to withstand greater shear stress 300 and peel stress 302 loads before failure initiation in adhesive bond 134.

In some examples, aerospace component joint 50 further comprises a plurality of adhesive-receiving recesses 204 defined in second bonding face 108 and spaced apart from one another along the width 118 of aerospace component joint 50. In some such examples, adhesive-receiving recesses 204 of second bonding face 108 are spaced apart from, or non-overlapping with, the adhesive-receiving recesses 204 of first bonding face 104. In such examples, aerospace component joint 50 comprises an alternating pattern of adhesive-receiving recesses 204 in first bonding face 104 and second bonding face 108. In some examples, aerospace component joint 50 comprises adhesive-receiving recesses in each of first bonding face 104 and second bonding face 108 when first component member 102 and second component member 106 each are formed of a fiber-reinforced plastic material.

Now with reference to FIG. 6, aerospace component joint 60 provides an example in which bond-enhancing features 200 comprise reinforcing protrusions 202. More specifically, reinforcing protrusions 202 are integral with first component member 102 and protrude from first bonding face 104. Reinforcing protrusions 202 extend through adhesive layer 112 and penetrate into second component member 106 through second bonding face 108. Reinforcing protrusions 202 extend through a substantial portion of second member thickness 126 and terminate within second component member 106. In other words, reinforcing protrusions 202 do not extend through, and/or do not penetrate, second counter face 128 of second component member 106.

Reinforcing protrusions 202 are configured to limit the shear stress 300 and/or peel stress 302 loads applied to adhesive bond 134 via first component member 102 and second component member 106. Stated differently, reinforcing protrusions 202 are configured to accept and/or relieve a portion of the shear stress 300 and peel stress 302 loads applied to adhesive bond 134. In this example, reinforcing protrusions 202 comprise first subset 206 of reinforcing protrusions 202 and second subset 208 of reinforcing protrusions 202 that are spaced apart from one another along width 118 and respectively positioned adjacent to and spaced inwardly from the corresponding longitudinal boundaries 120. Such a positioning of reinforcing protrusions 202 may increase the bond-enhancing effects of reinforcing protrusions 202, as shear stress 300 and peel stress 302 may be concentrated within adhesive bond 134 proximate to longitudinal boundaries 120.

First subset 206 and second subset 208 of reinforcing protrusions 202 each comprise a respective plurality of reinforcing protrusions 202. In some examples, first subset 206 and/or second subset 208 each comprise a plurality of rows of reinforcing protrusions 202 distributed along a substantial portion of the length of aerospace component joint 60. Additionally or alternatively, first subset 206 and/or second subset 208 of reinforcing protrusions 202 may comprise a plurality of ridges that extend along the length of aerospace component joint 60, such as discussed herein.

For reasons that are discussed in more detail herein, first component member 102 typically is formed of a metal, or metal alloy, while second component member 106 is formed of a plastic material or a fiber-reinforced plastic material.

FIG. 7 illustrates aerospace component joint 70, which provides another example in which bond-enhancing features 200 comprise reinforcing protrusions 202. Aerospace component joint 70 is similar to aerospace component joint 60; however, aerospace component joint 70 further comprises a plurality of additional subsets 210 of reinforcing protrusions 202. Additionally, first subset 206 and second subset 208 of reinforcing protrusions 202 in aerospace component joint 70 comprise fewer reinforcing protrusions due to additional subsets 210 of reinforcing protrusions.

More specifically, in this example, each additional subset 210 of reinforcing protrusions 202 comprises a respective plurality of reinforcing protrusions 202, and additional subsets 210 are evenly spaced apart from one another, and from first subset 206 and second subset 208, along width 118. Each additional subset 210 may comprise a plurality of rows of reinforcing protrusions and/or a plurality of ridges, such as discussed herein for first subset 206 and second subset 208.

Stated in more general terms, reinforcing protrusions 202 are evenly distributed along at least a substantial portion of the width 118 of aerospace component joint 70. In some examples, this distribution of reinforcing protrusions 202 delocalizes and/or distributes peel stress 302 and/or shear stress 300 loads across a larger area of aerospace component joint 70. In some examples, such a configuration reduces stress concentration within adhesive bond 134 and thereby permits aerospace component joint 70 to withstand greater peel stress 302 and/or shear stress 300 loads before failure initiation within adhesive bond 134.

Turning to FIG. 8, aerospace component joint 80 provides an example in which bond-enhancing features 200 comprise reinforcing protrusions 202 and adhesive-receiving recesses 204. Like example aerospace component joints 60 and 70, first component member 102 of aerospace component joint 80 is formed of a metal or a metal alloy, and second component member 106 of aerospace component joint 80 is formed of a plastic material or a fiber-reinforced plastic material.

As shown, reinforcing protrusions 202 project from first bonding face 104, and adhesive-receiving recesses 204 are defined in first bonding face 104. Similar to aerospace component joint 70, reinforcing protrusions 202 comprise first subset 206 of reinforcing protrusions 202, second subset 208 of reinforcing protrusions 202 and a plurality of additional subsets 210 of reinforcing protrusions 202 distributed between first subset 206 and second subset 208 of reinforcing protrusions 202. In this example, adhesive-receiving recesses 204 are disposed in an alternating pattern with reinforcing protrusions 202. Specifically, an adhesive-receiving recess 204 is disposed between adjacent subsets of reinforcing protrusions 202 to create an interspersed or alternating pattern of bond-enhancing features 200. In some examples, bond-enhancing features 200 are distributed along a substantial portion of the length of aerospace component joint 80. Reinforcing protrusions 202 and adhesive-receiving recesses 204 each provide the respective bond-enhancing characteristics discussed herein. In other words, aerospace component joint 80 comprises at least the bond-enhancements from reinforcing protrusions 202 in connection to aerospace component joint 70, and the bond-enhancements from adhesive-receiving recesses 204 discussed herein in connection to aerospace component joint 40.

Figure 9:
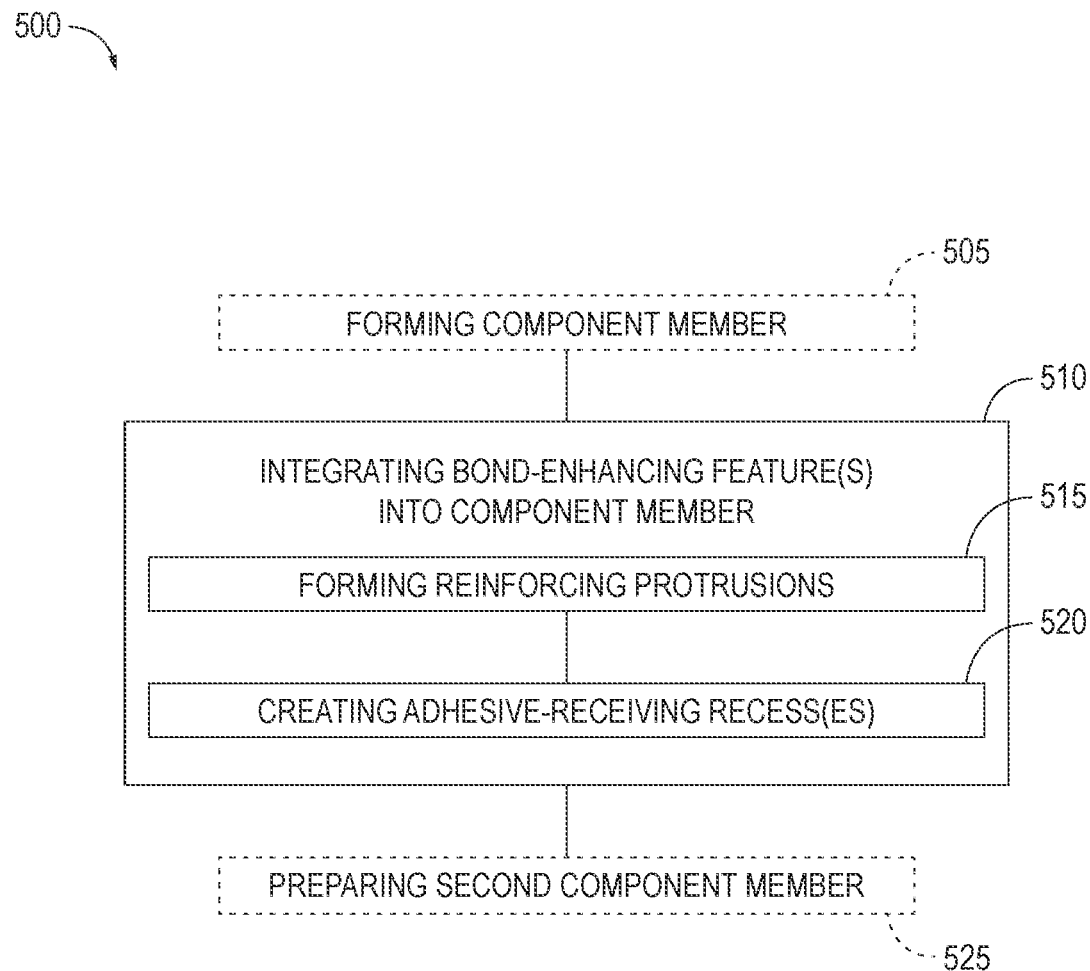
FIG. 9 is a flowchart schematically representing examples of methods of preparing a component member for an aerospace component joint according to the present disclosure.
Figure 10:
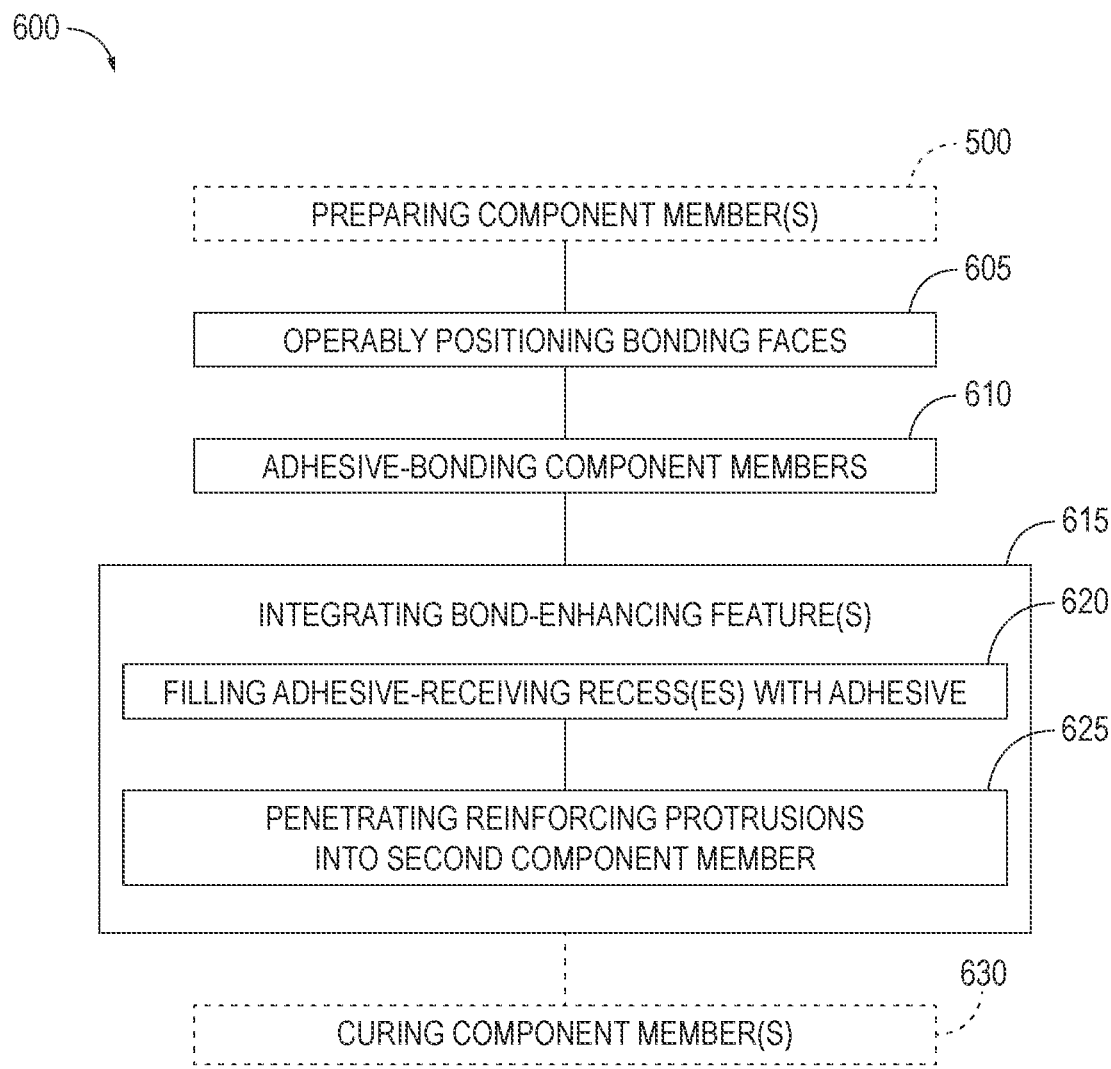
FIG. 10 is a flowchart schematically representing examples of methods of forming an aerospace component joint according to the present disclosure.

FIG. 9 provides a flowchart that represents illustrative, non-exclusive examples of methods 500, and FIG. 10 provides a flowchart that represents illustrative, non-exclusive examples of methods 600 according to the present disclosure. In FIGS. 9 and 10, some steps are illustrated in dashed boxes indicating that such steps are optional or may correspond to an optional version of methods 500 or methods 600 according to the present disclosure. That said, not all methods 500 and/or methods 600 according to the present disclosure are required to comprise each of the steps illustrated in solid boxes. The methods and steps illustrated in FIGS. 9 and 10 are not limiting, and other methods and steps are within the scope of the present disclosure, including methods having greater than or fewer than the number of steps illustrated, as understood from the discussion herein.

Methods 500 comprise preparing one or more component members for an adhesive-bonded aerospace component joint according to the present disclosure. Methods 600 comprise forming an adhesive-bonded aerospace component joint according to the present disclosure. In some examples, methods 500 comprise preparing the first component member 102 and/or the second component member 106 of the aerospace component joints 100 illustrated and discussed herein with reference to FIGS. 2-8. In some examples, methods 600 comprise forming the aerospace component joint 100 illustrated and discussed herein with reference to FIGS. 2-8. Thus, aerospace component joints 100, first component member 102, and/or second component member 106 thereof illustrated and discussed herein with reference to FIGS. 2-8 may incorporate any of the features, functions, properties, components, etc., as well as variants thereof, as those discussed herein with reference to methods 500 and FIG. 9 and/or methods 600 and FIG. 10 without requiring the inclusion of all such features functions, components, etc.

Likewise, the aerospace component joints 100, the first component member 102, and the second component member 106 thereof discussed herein with reference to FIG. 9 and methods 500 and/or FIG. 10 and methods 600 may incorporate any of the features, functions, properties, components, etc., as well as variants thereof, as those discussed herein with reference to FIG. 1 without requiring the inclusion of all such features functions, components, etc.

With reference to FIG. 9, methods 500 comprise integrating 510 one or more bond-enhancing features into the component member. The integrating 510 comprises forming 515 a plurality of reinforcing protrusions to be integral with the component member and to project from a bonding face of the component member. Additionally or alternatively, the integrating 510 comprises creating 520 one or more adhesive-receiving recesses in the bonding face of the component member. In some examples, methods 500 comprise forming 505 the component member. In some examples, methods 500 comprise preparing 525 a second component member for the aerospace component joint.

When comprised in methods 500, forming 505 the component member is performed in any suitable manner. In some examples, the forming 505 the component member varies depending on the material composition of the component member. For some examples in which the component member is formed from a metal, or a metal alloy, the forming 505 the component member comprises casting, molding, machining, milling, and/or additively manufacturing the metal, or metal alloy. For examples in which the component member is formed from a plastic material or a fiber-reinforced plastic material the forming 505 the component member comprises forming a layup of the plastic material or fiber-reinforced plastic material and shaping the layup of the plastic material or fiber-reinforced plastic material. In some examples, the shaping comprises milling, machining, molding, stamping, press forming, stamp forming, or continuous compression molding a feedstock material into the component member, such as the layup, into the desired shape.

In any of the above examples, the forming 505 the component member may comprise forming the one or more materials from which the component member is formed into the desired shape of the component member. In some examples, the forming 505 the component member comprises forming and/or shaping a bonding face of the component member. In some such examples, forming 515 the reinforcing protrusions and/or creating at 520 are performed during and/or as a portion of the forming 505 the component member.

In some examples, the component member is the first component member 102 of aerospace component joints 100 discussed herein, and the forming 505 the component member comprises forming the component member. Additionally or alternatively, in some examples, the component member is the second component member 106 of the aerospace component joints 100 discussed herein, and the forming 505 the component member comprises forming the second component member 106. In some examples, methods 500 comprise preparing the first component member 102 and the second component member 106 for the aerospace component joint 100. In some such examples, the forming 505 the component member comprises forming both of the first component member 102 and the second component member 106, such as in the same or different processes. In more specific examples, the forming 505 the component member comprises forming the first component member 102 from a metal or metal alloy and forming the second component member 106 from a plastic material or a fiber-reinforced plastic material.

The forming 505 the component member is performed with any suitable sequence or timing within methods 500, such as prior to and/or at least substantially simultaneously with integrating 510 and/or preparing 525.

As shown in FIG. 9, methods 500 comprise integrating 510 one or more bond-enhancing features into the component member. The integrating 510 comprises forming 515 reinforcing protrusions and/or creating 520 adhesive receiving recesses. In some examples, the integrating 510 comprises one of the forming 515 the reinforcing protrusions and the creating 520. In other examples, the integrating 510 comprises both of the forming 515 the reinforcing protrusions and the creating 520.

The forming 515 the reinforcing protrusions 202 comprises forming a plurality of the reinforcing protrusions 202 to be integral with the bonding face of the component member. In some examples, the forming 515 the reinforcing protrusions comprises forming the plurality of reinforcing protrusions 202 to be integral with the first bonding face 104 of the first component member 102. In some examples, the forming 515 comprises forming the reinforcing protrusions from a metal or metal alloy, which may be the same as or different from a metal or metal alloy from which the first component member 102 is formed. The forming 515 comprises forming any suitable number of reinforcing protrusions 202, with any suitable distribution along the first bonding face 104, as discussed herein. The forming 515 also comprises forming each reinforcing protrusion to have any suitable shape and/or dimensions, as discussed herein.

In some examples, the forming 515 the reinforcing protrusions 202 comprises forming the reinforcing protrusions 202 on the bonding face of the component member, and more specifically on the first bonding face 104 of the first component member 102. In some such examples, the forming 515 the reinforcing protrusions 202 comprises additively manufacturing the reinforcing protrusions on the first bonding face 104. In a more specific example, the forming 515 the reinforcing protrusions 202 comprises laser bed sintering the reinforcing protrusions on the bonding face.

In some examples, the forming 515 the reinforcing protrusions 202 comprises welding the plurality of reinforcing protrusions to the bonding face. In some examples, the welding comprises welding preformed reinforcing protrusions to the bonding face. In yet more specific examples, the welding comprises welding preformed pins or wires to the bonding face to create the plurality of reinforcing protrusions 202. In some examples, the forming 515 the reinforcing protrusions 202 comprises molding and/or casting the reinforcing protrusions 202 on the first bonding face 104. In some such examples, the forming 515 is performed at least substantially simultaneously with the forming 505 the component member.

Additionally or alternatively, in some examples, the forming 515 the reinforcing protrusions comprises subtractive manufacturing the bonding face of the component member to form the plurality of reinforcing protrusions. In some examples, the subtractive manufacturing comprises embossing, engraving, milling, and/or machining the bonding face to create the reinforcing protrusions 202.

The creating 520 comprises creating at least one adhesive-receiving recess 204 on the bonding face and optionally creating a plurality of adhesive-receiving recesses 204 on the bonding face. The creating 520 may be performed for examples in which the component member is formed of a metal or a metal alloy and/or for examples in which the component member is formed of a plastic material or a plastic composite material. In some examples, the creating 520 comprising creating the at least one adhesive-receiving recess 204 on the first bonding face 104 of the first component member 102 or on the second bonding face 108 of the second component member 106. For examples in which the integrating 510 comprises the forming 515 and the creating 520, the forming 515 and the creating 520 optionally are performed on the bonding face such that the reinforcing protrusions 202 and the adhesive-receiving recesses 204 are non-overlapping and/or distributed in an alternating relationship.

The creating 520 comprises creating any suitable number of adhesive-receiving recesses 204, each having any suitable conformation, dimensions, and/or disposal along the bonding face, as discussed herein. The creating 520 also is performed in any suitable manner. In some examples, the creating 520 comprises texturing the bonding face, and optionally a substantial portion of the area thereof, to create a plurality of adhesive-receiving recesses 204, as discussed herein. In some examples, the texturing comprises forming a textured conformation that forms the adhesive-receiving recesses, with examples of the textured conformation comprising crosshatched texture, dimpled texture, and/or cratered texture.

In some examples, the creating 520 comprises subtractive manufacturing the one or more adhesive-receiving recesses 204 in the bonding face after the component member is formed, for example, by machining, engraving, embossing, and/or milling the one or more adhesive-receiving recesses 204 into the bonding face. Additionally or alternatively, the creating 520 comprises embossing, stamp-forming, press-forming, and/or shaping the one or more adhesive-receiving recesses into the bonding face of the component member, which may be performed while the component member is uncured, partially cured, and/or during the forming 505.

In some examples, the integrating 510, and optionally the forming 505, are performed on, or prepare, the first component member 102 for the adhesive-bonded aerospace component joint 100. In some such examples, methods 500 further comprise preparing 525 the second component member 106 for the adhesive-bonded aerospace component joint 100. In some examples, the preparing 525 the second component member 106 comprises forming 505 the second component member 106. In some examples, the preparing 525 comprises performing the creating 520 on the second component member 106. For examples in which the methods 500 comprise performing the creating 520 on the first component member 102 and the second component member 106, the creating 520 may be performed in the same or a different manner on the first component member 102 and the second component member 106. In some examples, performing the creating 520 on the second component member 106 comprises disposing the one or more adhesive-receiving recesses 204 on the second bonding face 108 to be non-overlapping, when assembled in the aerospace component joint 100, with the adhesive-receiving recesses 204 and/or the reinforcing protrusions 202 on the first bonding face 104. In some examples, methods 500 do not include the preparing 525, for example, when the aerospace component joint 100 only comprises bond-enhancing features 200 integrated into the first component member 102.

Turning to FIG. 10, provided therein is a flowchart representing examples of methods 600 according to the present disclosure. Methods 600 are methods of forming an adhesive-bonded aerospace component joint between a first component member 102 and a second component member 106. As shown in FIG. 10, methods 600 comprise operably positioning 605 the first bonding face of the first component member and the second component member relative to one another, adhesive-bonding 610 the first bonding face and the second bonding face with one another, and integrating 615 one or more bond-enhancing features into the aerospace component joint. The integrating 615 comprises penetrating 625 a plurality of reinforcing protrusions that project from the first bonding face into the second component member and/or substantially filling 620 one or more adhesive-receiving recesses 204 with an adhesive. In some examples, methods 600 comprise preparing 500 the first component member and/or the second component member for the aerospace component joint. In some examples, methods 600 comprise curing 630 the first component member and/or the second component member.

For examples in which methods 600 comprise the preparing 500, the preparing 500 may comprise performing any of the methods 500 that are illustrated and discussed herein with reference to FIG. 9. In particular, the preparing 500 may comprise performing any suitable combination of the steps of methods 500 that are illustrated and discussed herein with reference to FIG. 9 to prepare the first component member 102 and/or the second component member 106 for the aerospace component joint 100. For examples in which methods 500 comprise the preparing 500, at least a portion of, and optionally the entirety of, the preparing 500 is performed prior to any other step or portion of methods 500.

The operably positioning 605 comprises overlapping the first bonding face 104 of the first component member 102 with the second bonding face 108 of the second component member 106. In some examples, the operably positioning 605 comprises overlapping the first bonding face 104 with the second bonding face 108 along the length 116 of the aerospace component joint 100 and/or along the bonded area 114 of the aerospace component joint 100. In some examples, the operably positioning 605 comprises overlapping the first bonding face 104 with the second bonding face 108 to a preselected extent that defines the width 118 of the aerospace component joint 100. In some examples, the operably positioning 605 comprises moving the first bonding face 104 and the second bonding face 108 towards one another until the first bonding face 104 and the second bonding face 108 are spaced apart from one another by a predetermined gap 110 having a predetermined thickness. In some examples, the predetermined thickness corresponds to the nominal thickness of an adhesive layer 112, as discussed herein. In some examples, the operably positioning 605 comprises positioning the first bonding face 104 and the second bonding face 108 to extend at least generally parallel with one another.

The operably positioning 605 is performed with any suitable sequence or timing within methods 600, such as prior to, or as a portion of, the adhesive-bonding 610, and/or the integrating 615 and/or prior to the curing 630.

The adhesive-bonding 610 the first bonding face 104 and the second bonding face 108 with one another comprises forming the adhesive bond 134 between the first bonding face 104 and the second bonding face 108, as discussed herein. In some examples, the adhesive-bonding 610 comprises introducing an adhesive between the first bonding face 104 and the second bonding face 108. In particular, the adhesive-bonding 610 comprises substantially filling the gap 110 between the first bonding face 104 and the second bonding face 108 with an adhesive layer 112. In some examples, the substantially filling the gap with the adhesive layer 112 comprises applying an adhesive to one or more of the first bonding face 104 and the second bonding face 108. In some examples, substantially filling the gap 110 with the adhesive comprises moving the first bonding face 104 and the second bonding face 108 towards one another during the operably positioning 605. Thus, in some examples, portions of the adhesive-bonding 610 and the operably positioning 605 are performed together. In some examples, the adhesive bonding comprises curing the adhesive between the first bonding face 104 and the second bonding face 108, such as subsequent to the operably positioning 605, and/or the substantially filling 620 the gap 110 with the adhesive layer 112. In some examples, the curing the adhesive layer 112 comprises setting, hardening, and/or solidifying the adhesive layer 112 and/or binding the adhesive layer 112 to the first bonding face 104 and the second bonding face 108.

Methods 600 further comprise integrating 615 the one or more bond-enhancing features 200 into the adhesive-bonded aerospace component joint 100. The integrating 615 comprises the penetrating 625 and/or the substantially filling 620. The penetrating 625 comprises penetrating a plurality of reinforcing protrusions 202, which project from the first bonding face 104 of the first component member 102 into the second component member 106 through the second bonding face 108 of the second component member 106, as discussed herein. Examples of the reinforcing protrusions 202 are discussed herein. In some examples, the penetrating 625 comprises penetrating each reinforcing protrusion 202 to the protrusion depth 212 within the second component member 106, as discussed herein.

The penetrating 625 may be performed for examples in which the first component member 102 is formed of a metal, or metal alloy, and the second component member 106 is formed of a plastic or a fiber-reinforced plastic material. In some such examples, the second component member 106 is uncured, or partially cured, during the penetrating 625, such as to permit the plurality of reinforcing protrusions to be penetrated into the second component member 106 without forming corresponding bores in the second component member for receiving the reinforcing protrusions 202. As discussed in more detail herein, in some such examples, methods 600 further comprise curing 630. In some such examples, methods 600 comprise methods of co-bonding the first component member 102 and the second component member 106.

In some examples, the penetrating 625 is performed substantially simultaneously with the operably positioning 605. In particular, in some examples, the moving the first bonding face 104 and the second bonding face 108 towards one another during the operably positioning 605 comprises the penetrating 625. In some examples, the penetrating 625 is performed subsequent to the introducing adhesive between the first bonding face 104 the second bonding face 108 and prior to the curing the adhesive between the first bonding face 104 and the second bonding face 108.

The substantially filling 620 comprises substantially filling the one or more adhesive-receiving recesses 204 with an adhesive. As discussed herein, the one or more adhesive-receiving recesses 204 are comprised in either or both of the first bonding face 104 of the first component member 102 and the second bonding face 108 of the second component member 106. Examples of adhesive-receiving recesses 204 are discussed herein. In some examples, the substantially filling 620 comprises substantially filling the one or more adhesive-receiving recesses 204 with the adhesive layer 112 and/or with adhesive from the adhesive layer 112. In some examples, the substantially filling 620 is performed during, or as a portion of, the adhesive-bonding 610. In particular, in some examples, the introducing the adhesive between the first bonding face 104 and the second bonding face 108 during the adhesive-bonding 610 comprises partially, and optionally substantially, filling the one or more adhesive-receiving recesses 204 with the adhesive.

Additionally or alternatively, in some examples, at least a portion of the substantially filling 620 is performed during the operably positioning 605. In particular, in some examples, the operably positioning 605 comprises flowing portions of the adhesive layer 112 into the one or more adhesive-receiving recesses 204 as the first bonding face 104 and the second bonding face 108 are moved towards one another. In any such examples, the substantially filling 620 is performed prior to the curing the adhesive. In some examples, the adhesive-bonding 610 comprises curing the adhesive layer 112 within the one or more adhesive-receiving recesses 204. In other words, in some examples, the adhesive-bonding 610 comprises adhesive bonding the adhesive layer 112 to the surfaces of the one or more adhesive-receiving recesses 204, which form portions of the first bonding face 104 or the second bonding face 108, as discussed herein.

The substantially filling 620 is performed with any suitable sequence or timing within methods 600, such as prior to, and/or substantially simultaneously with the penetrating 625. The substantially filling 620 also may be performed prior to, or during the operably positioning and/or as a portion of the adhesive-bonding 610.

In some examples, methods 600 further comprise curing 630 one or more of the first component member 102 and the second component member 106. The curing 630 is performed for examples in which the first component member 102 and/or the second component member 106 are formed of a plastic material or a fiber-reinforced plastic material that is uncured, or partially cured, during one or more steps of methods 600. In a more specific example, the curing 630 is performed for examples in which the integrating 615 comprises the penetrating 625, the first component member 102 is formed of a metal or a metal alloy, and the second component member 106 is uncured, or partially cured, during the penetrating 625, as discussed herein. In such examples, the curing 630 is performed subsequent to the penetrating 625. In this way, the second component member 106 is cured with the reinforcing protrusions of the first component member 102 penetrated therein. In some examples, the curing 630 is performed substantially simultaneously with the curing the adhesive or the adhesive layer of the adhesive-bonding 610. Examples of the curing 630 comprise cooling the second component member 106 and/or thermosetting the plastic or fiber-reinforced plastic material that forms the second component member 106.

Illustrative, non-exclusive examples of inventive subject matter according to the present disclosure are described in the following enumerated paragraphs:

A. An aerospace component joint (100) for an aircraft (10), the aerospace component joint (100) comprising:
a first component member (102) comprising a first bonding face (104);
a second component member (106) comprising a second bonding face (108) that overlaps with the first bonding face (104) along a bonded area (114) of the aerospace component joint (100), wherein the first bonding face (104) and the second bonding face (108) are separated from one another along the bonded area (114) by a gap (110);
an adhesive layer (112) substantially filling the gap (110) and forming an adhesive bond (134) between the first bonding face (104) and the second bonding face (108);
one or more bond-enhancing features (200), comprising at least one of:
a plurality of reinforcing protrusions (202) integral with the first component member (102), wherein the plurality of reinforcing protrusions (202) projects from the first bonding face (104), extends through the adhesive layer (112), and penetrates into the second component member (106) through the second bonding face (108); or
one or more adhesive-receiving recesses (204) defined in one or both of the first bonding face (104) and the second bonding face (108), wherein the adhesive layer (112) substantially fills each adhesive-receiving recess (204) of the one or more adhesive-receiving recesses (204).

A1. The aerospace component joint (100) of paragraph A, wherein the first bonding face (104) and the second bonding face (108) extend generally parallel to one another along the bonded area (114).

A2. The aerospace component joint (100) of any of paragraphs A-A1, wherein the adhesive layer (112) extends a length (116) of the aerospace component joint (100) and extends between a pair of longitudinal boundaries (120), wherein the longitudinal boundaries (120) extend the length (116) of the aerospace component joint (100) and are spaced apart from one another by a width (118) of the aerospace component joint (100).

A3. The aerospace component joint (100) of any of paragraphs A-A2, wherein the first component member (102) comprises a first joint edge (122) that defines one of a/the pair of longitudinal boundaries (120) and the second component member (106) comprises a second joint edge (124) that defines the other of the pair of longitudinal boundaries (120).

A4. The aerospace component joint (100) of any of paragraphs A-A3, wherein the plurality of reinforcing protrusions (202) is distributed along a substantial portion of a/the length (116) of the aerospace component joint (100).

A5. The aerospace component joint (100) of any of paragraphs A2-A4, wherein the plurality of reinforcing protrusions (202) is distributed along at least a substantial portion of the width (118) of the aerospace component joint (100).

A6. The aerospace component joint (100) of any of paragraphs A2-A5, wherein the plurality of reinforcing protrusions (202) comprises a first subset (206) of reinforcing protrusions (202) and a second subset (208) of reinforcing protrusions (202), wherein the first subset (206) of reinforcing protrusions (202) protrude into the second component member (106) adjacent to, and interior of, a/the first joint edge (122), and wherein the second subset (208) of reinforcing protrusions (202) protrude into the second component member (106) adjacent to, and interior of, a/the second joint edge (124).

A7. The aerospace component joint (100) of paragraph A6, wherein the first subset (206) of reinforcing protrusions (202) and the second subset (208) of reinforcing protrusions (202) are spaced apart from one another along the width (118) of the aerospace component joint (100).

A8. The aerospace component joint (100) of any of paragraphs A6-A7, wherein the plurality of reinforcing protrusions (202) further comprises at least one, and optionally a plurality of, additional subsets (210) of reinforcing protrusions (202), disposed between the first subset (206) of reinforcing protrusions (202) and the second subset (208) of reinforcing protrusions (202).

A9. The aerospace component joint (100) of any of paragraphs A6-A8, wherein the first subset (206) of reinforcing protrusions (202) and/or the second subset (208) of reinforcing protrusions (202) comprises at least one row, and optionally a plurality of rows, of reinforcing protrusions (202) that are distributed along a substantial portion of the length (116) of the aerospace component joint (100).

A10. The aerospace component joint (100) of any of paragraphs A2-A9, wherein the one or more adhesive-receiving recesses (204) extend along a substantial portion of the length (116) of the aerospace component joint (100).

A11. The aerospace component joint (100) of any of paragraphs A-A10, wherein one of the one or more adhesive-receiving recesses (204) comprises a groove formed in one of the first bonding face (104) and the second bonding face (108), and wherein the groove extends along the substantial portion of a/the length (116) of the aerospace component joint (100).

A12. The aerospace component joint (100) of paragraph A11, wherein the groove extends at a fixed distance between a/the pair of longitudinal boundaries (120) as it extends along the substantial portion of the length (116) of the aerospace component joint (100).

A13. The aerospace component joint (100) of paragraph A11, wherein the groove comprises a non-linear conformation.

A14. The aerospace component joint (100) of any of paragraphs A-A13, wherein the one or more adhesive-receiving recesses (204) comprise a plurality of adhesive-receiving recesses (204) defined in one of the first bonding face (104) or the second bonding face (108).

A15. The aerospace component joint (100) of paragraph A14, wherein the plurality of adhesive-receiving recesses (204) comprises a plurality of grooves defined in the one of the first bonding face (104) or the second bonding face (108).

A16. The aerospace component joint (100) of paragraph A15, wherein the plurality of grooves are spaced apart from one another along a/the width (118) of the aerospace component joint (100).

A17. The aerospace component joint (100) of paragraph A14, wherein the one of the first bonding face (104) or the second bonding face (108) comprises a textured conformation that defines the plurality of adhesive-receiving recesses (204).

A18. The aerospace component joint (100) of any of paragraphs A14-A17, wherein the plurality of adhesive-receiving recesses (204) are distributed along a/the width (118) of the aerospace component joint (100).

A19. The aerospace component joint (100) of any of paragraphs A-A18, wherein the plurality of reinforcing protrusions (202) comprises one or more of a plurality of pins, a plurality of columnar projections, and a plurality of ridges.

A20. The aerospace component joint (100) of any of paragraphs A-A19, wherein each reinforcing protrusion (202) of the plurality of reinforcing protrusions (202) is dimensioned to protrude into the second component member (106) by a protrusion depth (212), wherein the second component member (106) defines a second member thickness (126) along the bonded area (114) that is measured between the second bonding face (108) and a second counter face (128) of the second component member (106) that opposes the second bonding face (108), wherein the protrusion depth (212) of each reinforcing protrusion (202) is a threshold fraction of the second member thickness (126), and wherein the threshold fraction of the protrusion depth (212) to the second member thickness (126) is at least 60%, at least 65%, at least 70%, at least 75%, at least 80%, at least 85%, at least 90% at least 95%, at least 98%, at most 75%, at most 80%, at most 85%, at most 90%, at most 95%, at most 98%, and/or at most 99%.

A21. The aerospace component joint (100) of any of paragraphs A-A20, wherein each reinforcing protrusion (202) defines a cross-sectional area that is measured parallel to the first bonding face (104), wherein the plurality of reinforcing protrusions (202) defines a cumulative cross-sectional area that is a sum of the cross-sectional area of each of the plurality of reinforcing protrusions (202).

A22. The aerospace component joint (100) of paragraph A21, wherein the plurality of reinforcing protrusions (202) is configured such that the cumulative cross-sectional area thereof is at least substantially the same as a cumulative fastener cross-sectional area of fasteners comprised in an otherwise equivalent conventional aerospace component joint.

A23. The aerospace component joint (100) of paragraph A21, wherein each reinforcing protrusion (202) of the plurality of reinforcing protrusions (202) comprises a shear strength, wherein the plurality of reinforcing protrusions (202) comprises a cumulative shear strength that is the cumulative cross-sectional area multiplied by the shear strength, and wherein the plurality of reinforcing protrusions (202) is configured such that the cumulative strength thereof is equal to or greater than a limit shear load of the aerospace component joint (100).

A24. The aerospace component joint (100) of any of paragraphs A-A23, wherein the one or more adhesive-receiving recesses (204) each define a portion of the gap (110).

A25. The aerospace component joint (100) of any of paragraphs A-A24, wherein the adhesive layer (112) comprises a nominal thickness (130) that is measured between the first bonding face (104) and the second bonding face (108) outside of the one or more adhesive-receiving recesses (204), wherein each of the one or more adhesive-receiving recesses (204) defines a recess depth (214), wherein the recess depth (214) of each adhesive-receiving recess (204) is a threshold fraction of the nominal thickness (130), and wherein the threshold fraction of the recess depth (214) to the nominal thickness (130) is at least 100%, at least 200%, at least 300%, at least 400%, at least 500%, at least 600%, at least 700%, at least 800%, at least 900%, at most 300%, at most 400%, at most 500%, at most 600%, at most 700%, at most 800%, at most 900%, and/or at most 1000%.

A26. The aerospace component joint (100) of any of paragraphs A-A25, wherein each of the one or more adhesive-receiving recesses (204) is configured to create one or more corresponding regions of increased thickness in the adhesive layer (112).

A27. The aerospace component joint (100) of any of paragraphs A-A26, wherein the one or more adhesive-receiving recesses (204) comprises a first edge recess (216) defined in the first bonding face (104) and extending interiorly from a/the first joint edge (122) of the first component member (102).

A28. The aerospace component joint (100) of paragraph A27, wherein the first bonding face (104) along the first edge recess (216) extends towards the second bonding face (108) and forms a first edge recess angle (220) with the first bonding face (104) immediately adjacent to the first edge recess (216), and wherein the first edge recess angle (220) is at most 175 degrees (°), at most 170°, at most 160°, at most 150°, at most 140°, at most 130°, at most 135° at most 120°, at most 110°, at least 150°, at least 140°, at least 130°, at least 120°, at least 110°, and/or at least 100°.

A29. The aerospace component joint (100) of any of paragraphs A-A28, wherein the one or more adhesive-receiving recesses (204) comprises a second edge recess (218) defined in the second bonding face (108) and extending interiorly from a/the second joint edge (124) of the second component member (106).

A30. The aerospace component joint (100) of paragraph A29, wherein the second bonding face (108) along the second edge recess (218) extends towards the first bonding face (104) and forms a second edge recess angle (222) with the second bonding face (108) immediately adjacent to the second edge recess (218), and wherein the second edge recess angle (222) is at most 175°, at most 170°, at most 160°, at most 150°, at most 140°, at most 130°, at most 135° at most 120°, at most 110°, at least 150°, at least 140°, at least 130°, at least 120°, at least 110°, and/or at least 100°.

A31. The aerospace component joint (100) of any of paragraphs A-A30, wherein the first component member (102) is formed of a metal or a metal alloy, and the second component member (106) is formed of a plastic material.

A32. The aerospace component joint (100) of paragraph A31, wherein the plastic material is a fiber-reinforced plastic material.

A33. The aerospace component joint (100) of any of paragraphs A-A32, wherein the one or more bond-enhancing features (200) comprises the plurality of reinforcing protrusions (202) and the one or more adhesive-receiving recesses (204).

A34. The aerospace component joint (100) of any of paragraphs A-A33, wherein the one or more adhesive-receiving recesses (204) is defined in the first bonding face (104).

A35. The aerospace component joint (100) of any of paragraphs A-A34, wherein the one or more adhesive-receiving recesses (204) comprises a plurality of adhesive-receiving recesses (204), and wherein the plurality of reinforcing protrusions (202) and the plurality of adhesive-receiving recesses (204) are disposed in an alternating relationship along a/the width (118) of the aerospace component joint (100).

A36. The aerospace component joint (100) of any of paragraphs A-A35, wherein the one or more bond-enhancing features (200) only comprises the plurality of reinforcing protrusions (202).

A37. The aerospace component joint (100) of any of paragraphs A-A35, wherein the one or more bond-enhancing features (200) only comprises the one or more adhesive-receiving recesses (204).

A38. The aerospace component joint (100) of paragraph A37, wherein the first component member (102) and the second component member (106) are formed of a/the plastic material, and wherein the one or more adhesive-receiving recesses (204) comprises at least one adhesive-receiving recess (204) defined in each of the first bonding face (104) and the second bonding face (108).

A39. The aerospace component joint (100) of any of paragraphs A-A38, wherein the one or more adhesive-receiving recesses (204) are configured to prevent bond failures from propagating through the adhesive bond (134).

A40. The aerospace component joint (100) of any of paragraphs A-A39, wherein the plurality of reinforcing protrusions (202) is configured to reduce peel stress and/or shear stress applied to the adhesive bond (134) through the first component member (102) and the second component member (106).

A41. The aerospace component joint (100) of any of paragraphs A-A40, wherein the aerospace component joint (100) is formed according to the method (600) of any of paragraphs C-C11.

A42. An aircraft (10) comprising the aerospace component joint (100) of any of paragraphs A-A41.

A43. An aircraft (10) comprising a plurality of aerospace component joints (100), wherein each aerospace component joint (100) of the plurality of aerospace component joints (100) is the aerospace component joint (100) of any of paragraphs A-A41.

B. A method (500) of preparing a component member for an adhesive-bonded aerospace component joint (100), the method comprising:

integrating (510) one or more bond-enhancing features (200) into the component member, wherein the integrating (510) comprises at least one of:
  forming (515) a plurality of reinforcing protrusions (202) to be integral with the component member and to project from a bonding face of the component member; and
  creating (520) one or more adhesive-receiving recesses (204) in the bonding face of the component member.

B1. The method (500) of paragraph B, wherein the forming (515) the plurality of reinforcing protrusions (202) comprises forming the plurality of the reinforcing protrusions (202) on the bonding face of the component member.

B2. The method (500) of paragraph B1, wherein the forming (515) the plurality of reinforcing protrusions (202) comprises additively manufacturing the plurality of reinforcing protrusions (202) on the bonding face of the component member.

B3. The method (500) of paragraph B, wherein the forming (515) the plurality of reinforcing protrusions (202) comprises welding the plurality of reinforcing protrusions to the bonding face of the component member.

B4. The method (500) of any of paragraphs B-B3, wherein the creating (520) comprises machining the one or more adhesive-receiving recesses (204) into the bonding face of the component member.

B5. The method (500) of any of paragraphs B-B3, wherein the creating (520) comprises stamp-forming, molding, press-forming, and/or shaping the one or more adhesive-receiving recesses (204) into the bonding face of the component member.

B6. The method (500) of any of paragraphs B-B5, wherein the method (500) further comprises forming (505) the component member, and wherein the creating (520) is performed during the forming the component member.

B7. The method (500) of paragraph B6, wherein the forming (505) the component member comprises one of press forming, stamp forming, or continuous compression molding a feedstock material into the component member, and wherein the creating (520) is performed during the one of the press forming, the stamp forming, or the continuous compression molding.

B8. The method (500) of any of paragraphs B-B7, wherein the component member is a first component member (102), and wherein the method (500) further comprises preparing (525) a second component member (106), and wherein the preparing the second component member (106) comprises performing the creating (520) on the second component member (106).

B9. The method (500) of any of paragraphs B-B8, wherein the aerospace component joint (100) is the aerospace component joint (100) of any of paragraphs A-A40.

C. A method (600) of forming an adhesive-bonded aerospace component joint (100) between a first component member (102) comprising a first bonding face (104) and a second component member (106) comprising a second bonding face (108), the method (600) comprising:

operably positioning (605) the first bonding face (104) and the second bonding face (108) relative to one another, wherein the operably positioning (605) comprises overlapping the first bonding face (104) and the second bonding face (108) with one another;

adhesive-bonding (610) the first bonding face (104) and the second bonding face (108) with one another; and integrating (615) one or more bond-enhancing features (200) into the aerospace component joint (100), wherein the integrating (615) comprises one or more of:

penetrating (625) a plurality of reinforcing protrusions (202), which project from the first bonding face (104) of the first component member (102), into the second component member (106) through the second bonding face (108) of the second component member (106);

substantially filling (620) one or more adhesive-receiving recesses (204) with an adhesive, wherein the one or more adhesive-receiving recesses (204) are comprised in one or both of the first bonding face (104) of the first component member (102) and the second bonding face (108) of the second component member (106).

C1. The method (600) of paragraph C, wherein the operably positioning (605) comprises moving the first bonding face (104) and the second bonding face (108) towards one another until the first bonding face (104) and the second bonding face (108) are spaced apart from one another by a predetermined gap (110).

C2. The method (600) of paragraph C1, wherein the penetrating (625) is performed substantially simultaneously with the moving.

C3. The method (600) of any of paragraphs C-C2, wherein the adhesive-bonding (610) comprises introducing adhesive between the first bonding face (104) and the second bonding face (108), and wherein the substantially filling (620) is performed at least substantially simultaneously with the introducing.

C4. The method (600) of paragraph C3, wherein the adhesive-bonding (610) further comprises curing the adhesive between the first bonding face (104) and the second bonding face (108).

C5. The method (600) of paragraph C4, wherein the curing (630) comprises curing the adhesive within the one or more adhesive-receiving recesses (204).

C6. The method (600) of any of paragraphs C-C5, wherein the second component member (106) is uncured or partially cured during the penetrating (625), and wherein the method (600) further comprises curing (630) the second component member (106) subsequent to the penetrating (625).

C7. The method (600) of any of paragraphs C-C6, wherein the integrating (615) comprises the penetrating (625).

C8. The method (600) of any of paragraphs C-C7, wherein the integrating (615) comprises the filling (620).

C9. The method (600) of any of paragraphs C-C8, further comprising preparing (500) the first component member (102) for the aerospace component joint (100), wherein the preparing (500) comprises performing the method of any of paragraphs B-B9, and wherein the first component member (102) is the component member of any of paragraphs B-B9.

C10. The method (600) of paragraph C9, wherein the preparing (500) further comprises preparing (525) the second component member (106) for the aerospace component joint (100).

C11. The method (600) of any of paragraphs C-C10, wherein the aerospace component joint (100) is the aerospace component joint (100) of any of paragraphs A-A40.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. An aerospace component joint for an aircraft, the aerospace component joint comprising:
a first component member comprising a first bonding face;
a second component member comprising a second bonding face that overlaps with the first bonding face along a bonded area of the aerospace component joint, wherein the first bonding face and the second bonding face are separated from one another along the bonded area by a gap;
an adhesive layer substantially filling the gap and forming an adhesive bond between the first bonding face and the second bonding face;
one or more bond-enhancing features, comprising at least one of:
a plurality of reinforcing protrusions integral with the first component member, wherein the plurality of reinforcing protrusions projects from the first bonding face, extends through the adhesive layer, and penetrates into the second component member through the second bonding face; or
one or more adhesive-receiving recesses defined in one or both of the first bonding face and the second bonding face, wherein the adhesive layer substantially fills each adhesive-receiving recess of the one or more adhesive-receiving recesses.

2. The aerospace component joint of claim 1, wherein the first component member is formed of a metal or a metal alloy, and wherein the second component member is formed of a fiber-reinforced plastic material.

3. The aerospace component joint of claim 1, wherein the one or more bond-enhancing features comprise the plurality of reinforcing protrusions.

4. The aerospace component joint of claim 3, wherein the plurality of reinforcing protrusions is distributed along a substantial portion of a length of the aerospace component joint.

5. The aerospace component joint of claim 3, wherein the first component member comprises a first joint edge and the second component member comprises a second joint edge, wherein the aerospace component joint comprises a width that is defined between the first joint edge and the second joint edge; and
wherein the plurality of reinforcing protrusions comprises a first subset of reinforcing protrusions and a second subset of reinforcing protrusions, wherein the first subset of reinforcing protrusions protrude into the second component member adjacent to, and interior of, the first joint edge, and wherein the second subset of reinforcing protrusions protrude into the second component member adjacent to, and interior of, the second joint edge.

6. The aerospace component joint of claim 5, wherein the first subset of reinforcing protrusions and the second subset of reinforcing protrusions are spaced apart from one another along the width of the aerospace component joint, and wherein the plurality of reinforcing protrusions further comprises at least one additional subset of reinforcing protrusions, disposed between the first subset of reinforcing protrusions and the second subset of reinforcing protrusions.

7. The aerospace component joint of claim 3, wherein each reinforcing protrusion of the plurality of reinforcing protrusions is dimensioned to protrude into the second component member by a protrusion depth, wherein the second component member defines a second member thickness along the bonded area that is measured between the second bonding face and a second counter face of the second component member that opposes the second bonding face, wherein the protrusion depth of each reinforcing protrusion is a threshold fraction of the second member thickness, and wherein the threshold fraction of the protrusion depth to the second member thickness is at least 60% and at most 99%.

8. The aerospace component joint of claim 3, wherein each reinforcing protrusion of the plurality of reinforcing protrusions defines a cross-sectional area that is measured parallel to the first bonding face, wherein the plurality of reinforcing protrusions defines a cumulative cross-sectional area that is a sum of the cross-sectional area of each of the plurality of reinforcing protrusions, wherein each reinforcing protrusion of the plurality of reinforcing protrusions comprises a shear strength, wherein the plurality of reinforcing protrusions comprises a cumulative shear strength that is the cumulative cross-sectional area multiplied by the shear strength, and wherein the plurality of reinforcing protrusions is configured such that the cumulative shear strength thereof is equal to or greater than a limit shear load of the aerospace component joint.

9. The aerospace component joint of claim 3, wherein the plurality of reinforcing protrusions is configured to reduce peel stress or shear stress applied to the adhesive bond through the first component member and the second component member.

10. The aerospace component joint of claim 1, wherein the one or more bond-enhancing features comprise the one or more adhesive-receiving recesses.

11. The aerospace component joint of claim 10, wherein the one or more adhesive-receiving recesses extend along a substantial portion of a length of the aerospace component joint.

12. The aerospace component joint of claim 11, wherein one of the one or more adhesive-receiving recesses comprises a groove formed in one of the first bonding face and the second bonding face that extends along the substantial portion of the length of the aerospace component joint.

13. The aerospace component joint of claim 10, wherein the one or more adhesive-receiving recesses comprises a plurality of adhesive-receiving recesses, wherein one of the first bonding face and the second bonding face comprises a textured conformation that defines the plurality of adhesive-receiving recesses.

14. The aerospace component joint of claim 10, wherein the adhesive layer comprises a nominal thickness that is measured between the first bonding face and the second bonding face outside of the one or more adhesive-receiving recesses, wherein each of the one or more adhesive-receiving recesses defines a recess depth, wherein the recess depth of each of the one or more adhesive-receiving recesses is a threshold fraction of the nominal thickness, and wherein the threshold fraction of the recess depth to the nominal thickness is at least 100% and at most 1000%.

15. The aerospace component joint of claim 10, wherein the first component member comprises a first joint edge and the second component member comprises a second joint edge, wherein the aerospace component joint comprises a width that is defined between the first joint edge and the second joint edge, and wherein the one or more adhesive-receiving recesses comprises:
a first edge recess defined in the first bonding face and extending interiorly from the first joint edge of the first component member; and
a second edge recess defined in the second bonding face and extending interiorly from the second joint edge of the second component member.

16. The aerospace component joint of claim 10, wherein the one or more adhesive-receiving recesses are configured to prevent bond failures from propagating through the adhesive bond.

17. A method of forming an adhesive-bonded aerospace component joint between a first component member comprising a first bonding face and a second component member comprising a second bonding face, the method comprising:
    operably positioning the first bonding face and the second bonding face relative to one another, wherein the operably positioning comprises overlapping the first bonding face and the second bonding face with one another;
    adhesive-bonding the first bonding face and the second bonding face with one another; and
    integrating one or more bond-enhancing features into the aerospace component joint, wherein the integrating comprises one or more of:
        penetrating a plurality of reinforcing protrusions, which project from the first bonding face of the first component member, into the second component member through the second bonding face of the second component member; and
        substantially filling one or more adhesive-receiving recesses with an adhesive, wherein the one or more adhesive-receiving recesses are comprised in one or both of the first bonding face of the first component member and the second bonding face of the second component member.

18. The method of claim 17, further comprising preparing the first component member for the aerospace component joint, wherein the preparing comprises at least one of:
    forming the plurality of reinforcing protrusions to be integral with the first component member and to project from the first bonding face of the first component member; and
    creating the one or more adhesive-receiving recesses in the first bonding face of the first component member.

19. The method of claim 17, wherein integrating the one or more bond-enhancing features into the aerospace component joint comprises penetrating the plurality of reinforcing protrusions, which project from the first bonding face of the first component member, into the second component member through the second bonding face of the second component member.

20. The method of claim 19, wherein the second component member is uncured or partially cured prior to and during the penetrating, and wherein the method further comprises curing the second component member subsequent to the penetrating.

21. The method of claim 17, wherein integrating the one or more bond-enhancing features into the aerospace component joint comprises substantially filling the one or more adhesive-receiving recesses with the adhesive, wherein the one or more adhesive-receiving recesses are comprised in one or both of the first bonding face of the first component member and the second bonding face of the second component member.

22. The method of claim 21, wherein the adhesive-bonding comprises introducing the adhesive between the first bonding face and the second bonding face, and wherein the substantially filling is performed at least substantially simultaneously with the introducing.

23. The method of claim 21, wherein the adhesive-bonding further comprises curing the adhesive between the first bonding face and the second bonding face, and wherein the curing comprises curing the adhesive within the one or more adhesive-receiving recesses.

* * * * *